United States Patent
Terao et al.

(10) Patent No.: US 6,615,352 B2
(45) Date of Patent: *Sep. 2, 2003

(54) DEVICE AND METHOD FOR AUTHENTICATING USER'S ACCESS RIGHTS TO RESOURCES

(75) Inventors: Taro Terao, Nakai-machi (JP); Rumiko Kakehi, Nakai-machi (JP); Masaki Kyojima, Nakai-machi (JP)

(73) Assignee: Fuji Xerox Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,932

(22) Filed: Jul. 20, 1998

(65) Prior Publication Data

US 2003/0097567 A1 May 22, 2003

(30) Foreign Application Priority Data

Aug. 5, 1997 (JP) .............................. 9-210487

(51) Int. Cl.$^7$ ............................... H04L 9/32
(52) U.S. Cl. ................. 713/184; 713/170; 713/182
(58) Field of Search ................... 713/184, 185, 713/172, 168, 176, 180, 201, 170, 171, 174, 182

(56) References Cited

U.S. PATENT DOCUMENTS 5,987,134 A * 11/1999 Shin et al. ................ 713/159

* cited by examiner

Primary Examiner—Matthew Smithers
(74) Attorney, Agent, or Firm—Oliff & Berridge, PLC

(57) ABSTRACT

A burden caused by handling a large number of unique identifying information pieces such as authentication keys is to be lightened from both the user side and the protector side such as application creators. A proof data verification device sends authentication data to a proof data generation device. The proof data generation device generates proof data from both received authentication data and user unique identifying information held therein and sends it back to the proof data verification device. The proof data verification device holds an access ticket and authentication data, and verification means in the verification device performs a signature verifying calculation by use of the proof data, authentication data, and the access ticket. If the verification is successful, the execution of program is allowed.

21 Claims, 17 Drawing Sheets

OPERATION OF PROOF DATA VERIFICATION DEVICE IN THE FIRST EMBODIMENT

ENTIRE CONFIGURATION

CONFIGURATION OF PROOF DATA VERIFICATION DEVICE

OPERATION OF PROOF DATA VERIFICATION DEVICE IN THE FIRST EMBODIMENT

OPERATION OF PROOF DATA VERIFICATION DEVICE IN THE SECOND EMBODIMENT

OPERATION OF PROOF DATA VERIFICATION DEVICE IN THE THIRD EMBODIMENT

OPERATION OF PROOF DATA VERIFICATION DEVICE IN THE FOURTH EMBODIMENT

OPERATION OF PROOF DATA VERIFICATION DEVICE IN THE FIFTH EMBODIMENT

OPERATION OF PROOF DATA VERIFICATION DEVICE IN THE SIXTH EMBODIMENT

OPERATION OF PROOF DATA VERIFICATION DEVICE IN THE SEVENTH EMBODIMENT

OPERATION OF PROOF DATA VERIFICATION DEVICE IN THE EIGHTH EMBODIMENT

OPERATION OF PROOF DATA VERIFICATION DEVICE IN THE NINTH EMBODIMENT

OPERATION OF PROOF DATA VERIFICATION DEVICE IN THE TENTH EMBODIMENT

OPERATION OF PROOF DATA GENERATION DEVICE IN THE FIRST AND SECOND EMBODIMENTS

OPERATION OF PROOF DATA GENERATION DEVICE IN THE THIRD EMBODIMENT

OPERATION OF PROOF DATA GENERATION DEVICE IN THE FOURTH EMBODIMENT

OPERATION OF PROOF DATA GENERATION DEVICE IN THE FIFTH EMBODIMENT

OPERATION OF PROOF DATA GENERATION DEVICE IN
THE EIGHTH AND NINTH EMBODIMENTS

OPERATION OF PROOF DATA GENERATION DEVICE IN
THE TENTH EMBODIMENT

DEVICE AND METHOD FOR AUTHENTICATING USER'S ACCESS RIGHTS TO RESOURCES

BACKGROUND OF THE INVENTION

1. Field of the Invention

The present invention relates to an authentication technique for authenticating user's access rights to resources.

2. Description of the Prior Art

As the prior art belonging to the same field as the present invention there is known a program execution control technique, which comprises:

(1) embedding a user authentication routine in an application program;

(2) the routine checking whether the user who is trying to execute the application possesses a regular key for authentication; and (3) continuing the execution of the program only when the presence of the key for authentication has been confirmed, or stopping the execution of the program if the answer is negative.

By utilizing this control technique, only a regular user possessing an authentication key is allowed to execute the application program. This technique is in practical use in the software distribution business. As examples of products produced according to this technique are mentioned Sentinel Super Pro (trademark) of Rainbow Technologies, Inc. and HASP (trademark) of Aladdin Knowledge Systems Ltd.

The following is a more detailed explanation of the program execution control technique.

(1) The user who executes a software program possesses an authentication key as a user identifying information. The authentication key is a key for encryption, which is distributed to users by a person who permits the utilization of software, for example a software vender. The authentication key, for the prevention of duplication, is sealed firmly into memory or the like in hardware and is delivered to the associated user by physical means such as mail or the like.

(2) The user loads the hardware with the authentication key incorporated therein into a his or her work station/personal computer by a specified method. For example, the hardware is loaded into a printer port.

(3) When the user starts the application program and the execution of the program reaches the user authentication routine, the program communicates with the hardware which incorporates the user authentication key therein. On the basis of the communication the program checks whether the authentication key is correct or not, and if the key is correct, execution shifts to the next step. On the other hand, if the communication fails and the presence of the authentication key cannot be confirmed, the program itself stops to inhibit subsequent execution.

Identification of the authentication key in the authentication routine is performed in accordance with the following protocol.

(1) The authentication routine generates an appropriate number and transmits it to the key-containing hardware.

(2) The key-containing hardware, using the authentication key contained therein, encrypts the transmitted number and sends it back to the authentication routine.

(3) The authentication routine judges whether the replied number is an anticipated number or not, that is, whether it is a number obtained by encrypting the transmitted number to the hardware with the correct authentication key.

(4) In the case where the replied number coincides with the anticipated number, the execution of the program is continued, while otherwise, the execution of the program is stopped.

In this case, the communication between the application program and the authentication key-containing hardware must differ at every execution even if exchange is made with the same hardware at the same location in the same application. Otherwise, if the contents of communication in a normal execution process are once recorded and if subsequently a reply is made to the application program in accordance with the recorded contents at every execution of program, it becomes possible for even a user not possessing a correct authentication key to execute the program. Such an improper execution of the application program by the reproduction of communication contents is called a replay attack.

To prevent such a replay attack, a random number which is newly generated at every communication is used as the number sent to the key-containing hardware.

The prior art described above involves the problem that at the time of making an application program it is required for the programmer to assume an authentication key of a user in advance and then perform a program protection processing on the basis of the authentication key.

That is, the programmer is required to anticipate a correct reply from the key-containing hardware at the time of programming and then create a program so that the program is executed correctly only upon receipt of a correct reply.

The prior art described above is utilized basically in two ways, both of which, however, involves the following problems.

(1) According to the first method, different authentication keys are provided for different users. More particularly, a different authentication key is provided for each user such as authentication key A for user A and authentication key B for user B.

In this case, it is necessary for the programmer to make a program while changing the authentication routine in the program appropriately for each user. In more particular terms, since the authentication key differs for each user, it is required that the authentication routine in the program be prepared so as to identify the authentication key peculiar to the each user who utilizes the program. In other words, the programmer is required to make as many different programs as the number of users who utilize the program.

In the case where a large number of users are involved, the work for individualizing programs for each user requires intolerable labor for the programmer, and the list of user authentication keys to be managed becomes vast.

(2) According to the second method, the programmer prepares a different authentication key for each application, for example, like authentication key A for application A and authentication key B for application B. And each application program is prepared so as to identify a unique authentication key.

According to this second method, unlike the first method, it is no longer necessary to make a program individually for each user, but the user is required to possess authentication keys by the number of applications to be utilized.

Such a limitation gives rise to the following problems for both programmer and users.

As noted previously, it is necessary that authentication keys be delivered in a firmly sealed state to users. Thus, in contrast with the program itself which can be distributed easily through a network, the distribution of hardware which contains an authentication key must rely on physical means such as mail or the like. This limitation is a heavy burden on the programmer in all of cost, time and packing work.

There arises the inconvenience that even if a user wants to use a certain application, the user must wait for the arrival of hardware with an authentication key sealed therein and cannot use it at once.

To lighten this burden there is adopted a method wherein a plurality of authentication keys are sealed beforehand in hardware, and each time the user is permitted to use a new application, a password for making an unused authentication key in hardware utilizable is given to the user. However, it is apparent that the foregoing problems are basically not solved even by this method. Actually, in commercialization, a design is made so as to permit adjacent connection of plural hardware units.

Thus, even if either of the above two methods is adopted, there still remain problems in point of convenience on both programmer and user sides.

Considering external characteristics of the execution control, the prior art may also be applicable to the protection of mail privacy, access control for file and computer resources, and other ordinary access control for digital contents. However, due to the foregoing problems, it is impossible to apply the prior art to those fields.

SUMMARY OF THE INVENTION

The present invention has been accomplished in view of the above-mentioned circumstances and it is an object of the invention to provide a user's access rights authentication technique capable of solving inconveniences derived from handling of many unique identifying information pieces such as authentication keys which occur on both the user side and the protector side such as an application creator and further capable of easily authenticating a user's access rights in performing program execution control, the protection of access qualification of digital contents (e.g. static and dynamic images and voice), mail privacy protection, and access control for file and computer resources.

According to the present invention, in order to achieve the above-mentioned object, there is provided a user's access rights authentication device for authenticating a user's access rights by verifying the legitimacy of proof data generated for proving the right of the user, the user's access rights authentication device comprising a first memory means for storing authentication data, a second memory means for storing user unique identifying information, a third memory means for storing a proof support information which is the result of having executed a predetermined calculation, authentication data stored in the first memory means, a proof data generation means which performs a predetermined calculation for both the authentication data held in the first memory means and the user unique identifying information held in the second memory means, to generate proof data, and a proof data verification means which performs a predetermined calculation for both the proof data generated by the proof data generation means and the proof support information held in the third memory means, to verify that the proof data has been generated on the basis of the user unique identifying information. The unique security characteristic information is used as a digital signature key based on a discrete logarithm problem of a linear algebraic group on a finite field (a group constituted by an invertible matrix of a finite field coefficient; hereinafter referred to simply as "algebraic group").

In the above construction, by introducing the proof support information (access ticket) it is possible to make unique security characteristic information and user unique identifying information independent of each other, so that it suffices for each of the protector side and the user side to prepare only one piece of unique identifying information.

The access ticket is data calculated on the basis of both specific user unique identifying information and unique security characteristic information. Without the knowledge of user unique identifying information, it is difficult to calculate a unique security characteristic information from the access ticket. Only when a correct combination of user unique identifying information and access ticket, namely a combination of user unique identifying information and access ticket calculated on the basis of the user unique identifying information, is inputted, correct proof data is calculated. Therefore, the user holds unique identifying information in advance and the protector side such as a programmer provides unique security characteristic information independently of the unique identifying information which the user possesses, then access ticket is prepared and distributed in accordance with the user unique identifying information and the unique security characteristic information which has been used, for example, in the creation of an application program. By so doing, it is possible to authenticate the user's access rights to resources such as execution control.

The present invention can be realized also as a method. Further, at least part of the present invention can be realized as a program product.

In connection with the above configuration, the proof data verification means may be provided with a random number generation means so that a random number generated by the random number generation means is stored as authentication data in the first memory means.

The proof data verification means may be configured so as to verify that the proof data generated by the proof data generation means results from performing a predetermined calculation for both authentication data as the above random number and user unique identifying information.

For the above calculation there may be adopted the following method.

First, ElGamal signature is employable. Algebraic group is generally non-commutative, but there will appear only a cyclic subgroup in the following description, so for convenience in notation the group calculation will be described in an additive manner.

To be more specific, in an algebraic group Rover a finite field, if the point with an order of n is assumed to be P, a unique security characteristic information is assumed to be x, and verification information Y corresponding to x is assumed to be a point (Y=xP) on G obtained by multiplying the P by x, then the foregoing proof data generation means generates as proof data both point R on G and a positive integer s, while the foregoing proof data verification means generates a value rt by multiplying the proof support information t stored in the third memory means by a positive integer r determined from R and verifies that the sum of the value obtained by multiplying the Y by the positive integer r determined from R, the value obtained by multiplying R by s and the value obtained by multiplying the P by [(−rt) mod n], on G, is equal to the value obtained by multiplying the point P by m using the authentication data stored in the first memory means (mP=rY+sR−rtP).

Or, in an algebraic group G on a finite field, if the point with an order of n is P, unique security characteristic information is a positive integer x, and verification information Y corresponding to the x is a point (Y=xP) on G obtained by multiplying the P by x, then the proof data generation means generates as proof data both point R on G and a positive integer s, while the proof data verification means generates a value rt by multiplying the proof support information t stored in the third memory means by a positive integer r determined from R and verifies that the sum of the value obtained by multiplying the Y by rt and the value obtained by multiplying R by s, on G, is equal to the value obtained by multiplying the point P by m using the authentication data stored in the first memory means (mP=rtY+sR).

Or, in an algebraic group G on a finite field, when the point with an order of n is assumed to be P and for generating, as proof data, both point R on G and a positive integer s, the proof data generation means generates an appropriate random number k, then multiplies the P by k on G, assumes the resulting point to be R (=kP), then uses at least a positive integer f which is determined from the user unique identifying information e stored in the second memory means, a positive integer r determined from point R, and the authentication data m stored in the first memory means, then, under the modulus n, subtracts the product of f and r from m, and multiplies the resulting difference by the inverse of k to calculate s [=(m−rf)k$^{-1}$ mod n], thereby generating proof data R and s.

Or, in an algebraic group G on a finite field, when the point with an order of n is assumed to be P and for generating as proof data both point R on G and a positive integer s, the proof data generating means generates an appropriate random number k, multiplies the P by k on G, assumes the resulting point to be R (=kP), then uses at least a positive integer f generated by performing a predetermined calculation for both the user unique identifying information e stored in the second memory means and information which defines the above algebraic group, a positive integer r determined from point R, the above k, and the authentication data m stored in the first memory means, then, under the modulus n, subtracts the product of f and r from m, and multiplying the resulting difference by the inverse of k to calculate s [=(m−rf)k$^{-1}$ mod n], thereby generating both proof data R and s.

In an algebraic group G on a finite field $F_q$ with q elements, if the point with an order of n on G is assumed to be P, a unique security characteristic information is assumed to be a positive integer x, verification information Y corresponding to the x is assumed to be a point (Y=xP) on G obtained by multiplying the P by x, then the proof support information t stored in the third memory is the data obtained by subtracting a positive integer f from the above x which positive integer f is generated by performing a predetermined calculation for the user unique identifying information e stored in the second memory means, and in generating point R on G and a positive integer s, the proof data generation means may generate an appropriate random number k, multiplies the P by k on G, assume the resulting point to be R (=kP), use the positive integer f, the random number k and the authentication data m stored in the first memory means, then under the modulus n, subtract the product of f and r from m and multiply the resulting difference by the inverse of k to generate s [=(m−rf)k$^{-1}$ mon n], while the proof data verification means may verify that, on G, the sum of the value obtained by multiplying the Y by r, the value obtained by multiplying R by s and the value obtained by multiplying P by [(−rt) mod n] is equal to the value obtained by multiplying P by m using the authentication data (mP=rY+sR−rtP).

In an algebraic group G on a finite field $F_q$ with q elements, if the point with an order of n on G is assumed to be P, unique security characteristic information is assumed to be a positive integer x, and verification information Y corresponding to the x is assumed to be a point (Y=xP) on G obtained by multiplying the P by x, then the proof support information t stored in the third memory means is the data obtained by subtracting a positive integer f from the x which positive integer f is generated by performing a predetermined calculation for both user unique identifying information e stored in the second memory means and the above q and G, and in generating as proof data both point R on G and a positive integer s, the proof data generation means may generate an appropriate random number k, assume the point obtained by multiplying the P by k on G to be R (=kP), use the above positive integer f, the random number k and the authentication data m stored in the first memory means, then, under the modulus n, subtract the product of f and r from m, and multiply the resulting difference by the inverse of k to generate s [=(m−rf)k$^{-1}$ mod n], while the proof data verification means may verify that the sum of the value obtained by multiplying the Y by r, the value obtained by multiplying R by s and the value obtained by multiplying P by [(−rt)mod n], on G, is equal to the value obtained by multiplying P by m using the authentication data (mP=rY+sR−rtP).

In an algebraic group G on a finite field $F_q$ with q elements, if the point with an order of n on G is assumed to be P, a unique security characteristic information is assumed to be a positive integer x, and verification information Y corresponding to the x is assumed to be a point (Y=xP) on G obtained by multiplying the P by x, then the proof support information t stored in the third memory means is the data [t=x$^{-1}$ f (e, n, q, P, G) mod n] obtained by multiplying, under the modulus n, an inverse element x$^{-1}$ of the above x by a non-conflictive function value f (e, n, q, P, G) which depends on the user unique identifying information e stored in the second memory means and also on the above n, q, P and G, and in generating, as proof data, a point R corresponding to the value of r determined from point as well as a positive integer s, the proof data generation means may generate an appropriate random number k, assume the point obtained by multiplying the P by k on G to be R (=kP), use the above e, n, q, P, G, f (e, n, q, P, G) and authentication data m stored in the first memory means, then, under the modulus n, subtract the product of f (e, n, q, P, G) and r from m, and multiply the resulting difference by the inverse of k to generate s {=[m−rf (e, n, q, P, G)] k$^{-1}$ mod n}, while the proof data verification means may verify that, on G, the sum of the value obtained by multiplying the Y by rt and value obtained by multiplying R by s is equal to the value obtained by multiplying P by m using the authentication data (mP=rtY+sR).

There also may be used Nyberg-Rueppel signature.

More specifically, in an algebraic group G on a finite field, given that the point with an order of n is P, a unique security characteristic information is a positive integer x, and verification information Y corresponding to the x is a point (Y=xP) on G obtained by multiplying the P by x, then the proof data generation means may generate positive integers r and s as proof data, while the proof data verification means may generate the value rt by multiplying the proof support information t stored in the third memory means by the r, then, on G, calculate the sum K of the value obtained by multiplying the Y by r, the value obtained by multiplying the P by s and the value obtained by multiplying the P by −rt, (K=rY+sP−rtP), and then verify that the difference between the r and the value k determined from point K is congruent with the authentication data m stored in the first memory means, under the modulus n, (m≡r−k mod n).

In an algebraic group G on a finite field, given that the point with an order of n is P, unique security characteristic information is a positive integer x, and verification information Y corresponding to the x is a point (Y=xP) on G obtained by multiplying the P by x, and for generating positive integers r and s as proof data, then the proof data generation means may generate an appropriate random number u, assume the point obtained by multiplying the P by u on G to be V (=uP), then under the modulus n add the value v determined from V and the authentication data m to obtain the value r as the sum (r=m+v mod n), then use a non-conflictive function value f which depends on both user unique identifying information e stored in the second memory means and information which defines the above algebraic group, as well as the above u and r, and subtract the product of f and r from u under the modulus n to obtain the value s as the difference (s=u−rf mod n).

In an algebraic group G on a finite field with q elements, given that the point with an order of n on G is P, a unique security characteristic information is a positive integer x, and verification information Y corresponding to the x is a point (Y=xP) on G obtained by multiplying the P by x, then the proof support information t stored in the third memory means is the data [t=x−f (e, n, q, P, G)] obtained by subtracting a non-conflictive function value f (e, n, q, P, G) from the x which value f is dependent on the user unique identifying information e stored in the second memory means and the above n, q, P, G, and for generating positive integers r and s as proof data, the proof data generation means may generate an appropriate random number u, assume the point obtained by multiplying the P by u on G to be V (=uP), then under the modulus n add the value v determined from V and the authentication data m stored in the first memory means to obtain the value r as the sum (r=m+v mod n), use the above e, n, q, P, G and f (e, n, q, P, G), and subtract the product of f (e, n, q, P, G) and r from u under the modulus n to obtain the value s as the difference [s=u−rf (e, n, q, P, G) mod n], while the proof data verification means may calculate on G the sum K of the value obtained by multiplying the Y by r, the value obtained by multiplying P by s and the value obtained by multiplying P by −rt, (K=rY+sP−rtP), and verify that the difference between the r and the value k determined from point K is congruent with the authentication data m under the modulus n (m≡r−k mod n).

Further, there may be used Schnorr signature.

More specifically, in an algebraic group G on a finite field, given that the point with an order of n is P, unique security characteristic information is a positive integer x, and verification information Y corresponding to x is a point (Y=xP) on G obtained by multiplying the P by x, then the proof data generation means may generate positive integers h and s as proof data, while the proof data verification means may generate the value ht by multiplying the proof support information t stored in the third memory means by the positive integer h, then subtract the value obtained by multiplying the P by ht from the sum of the value obtained by multiplying the Y by h and the value obtained by multiplying the P by s to afford the value V as the difference, (V=hY+sP−htP), and verify that a collision-free function value H (v|m), which depends on a combined value of both value v determined from V with the authentication data m stored in the first memory means, is equal to the positive integer h, [h=H (v|m)].

In an algebraic group G on a finite field, given that the point with an order of n is P, a unique security characteristic information is a positive integer x, and verification information Y corresponding to the x is a point (Y=xP) on G obtained by multiplying the P by x, and for generating positive integers h and s as proof data, then the proof data generation means may generate an appropriate random number k, assume the point obtained by multiplying the P by k on G to be R (=kP), use a collision-free function value H (r|m), which depends on a combined value of both value r determined from R and authentication data m stored in the first memory means, a non-conflictive function value f which depends on both user unique identifying information e stored in the second memory means and information which defines the above algebraic group, the random number k and the positive integer h, and subtract the product of f and h from k under the modulus n to afford the difference s (=k−hf mod n).

In an algebraic group G on a finite field $F_q$ with q elements, given that the point with an order of n on G is P, unique security characteristic information is a positive integer x, and verification information Y corresponding to the x is a point (Y=xP on G obtained by multiplying the P by x, then the proof support information t stored in the third memory means is the data [t=x−f (e, n, q, P, G)] obtained by subtracting a collision-free function value f (e, n, q, P, G) from the x which value f depends on the user unique identifying information e stored in the second memory and also on the above n, q, P and G, and for generating positive integers h and s as proof data, the proof data generation means may generate an appropriate random number k, assume the point obtained by multiplying the P by k on G to be R (=kP), then use a collision-free function value H (r|m) which depends on a combined value of both value r determined from R with authentication data m stored in the first memory means, as well as the above k, h, e, n, q, P, G and f (e, n, q, P, G), and subtract the product of f (e, n, q, P, G) and h from k under the modulus n to generate the difference s [=k−hf (e, n, q, P, G) mod n], while the proof data verification means may generate the value ht by multiplying the proof support information t by the positive integer h, then subtract the value obtained by multiplying the P by ht from the sum of the value obtained by multiplying the P by s and the value obtained by multiplying the Y by h, on G, to afford the value R' (=sP+hY−htP), and verify that the output of a collision-free function H, which receives a combined value of both value r' determined from R' and authentication data m, is equal to h, [h=H(r'|m)].

Further, there may be used DSA signature.

More specifically, in an algebraic group G on a finite field, given that the point with an order of n is P, unique security characteristic information is a positive integer x, and verification information Y corresponding to the x is a point (Y=xP) on G obtained by multiplying the P by x, then the proof data generation means may generate positive integers r and s as proof data, while the proof data verification means may generate an inverse element w (=$s^{-1}$ mod n) of s under the modulus n, then generate the value wr by multiplying the r by the w, the value wrt by multiplying the proof support information t stored in the third memory means by the r, and the value wm by multiplying the authentication data m stored in the first memory means by the w, and verify that, on G, the value v determined from the value V (=wrY+wmP−wrtP) is equal to the r under the modulus n (v≡r mod n) which value V results from subtracting the value obtained by multiplying P by wrt from the sum of the value obtained by multiplying Y by wr and the value obtained by multiplying P by wm.

In an algebraic group G on a finite field, given that the point with an order of n is P, unique security characteristic information is a positive integer x, and verification information Y corresponding to the x is a point (Y=xP) on G obtained by multiplying the P by x, then the proof data generation means may generate positive integers r and s as proof data, while the proof data verification means may generate an inverse element w ($=s^{-1}$ mod n) of s under the modulus n, further generate the value wrt by multiplying the proof support information t stored in the third memory by the above r and w, and the value wm by multiplying the authentication data m stored in the first memory means by the above w, and verify that, on G, the value v determined from the value V ($=$wrtY$+$wmP) is equal to the r under the modulus n (v$=$r mod n) which value V is the sum of the value obtained by multiplying the Y by wrt and the value obtained by multiplying the P by wm.

In an algebraic group G on a finite field, given that the point with an order of n is P, a unique security characteristic information is a positive integer x, and verification information Y corresponding to the x is a point (Y$=$xP) on G obtained by multiplying the P by x, and for generating, as proof data, a point R which takes the value r determined from point, as well as a positive integer s, then the proof data generation means may generate an appropriate random number k, assume that the value determined from point R ($=$kP) obtained by multiplying the P by k on G is r, then use a non-conflictive function value H(m) which depends on the authentication data m stored in the first memory means, a collision-free function value f dependent on both user unique identifying information e and information which defines the above algebraic group, and the above r, and then multiply the reciprocal of k by the difference obtained by subtracting the product of f and r from H(m) under the modulus n to thereby calculate s [$=$(H(m)$-$rf)$k^{-1}$ mod n].

In an algebraic group G on a finite field $F_q$ having q number of elements, given that the point with an order of n on G is P, a unique security characteristic information is a positive integer x, and verification information corresponding to x is a point (Y$=$xP) on G obtained by multiplying the P by x, then the proof support information t stored in the third memory means is the data [t$=$x$+$f (e, n, q, P, G)] obtained by adding a collision-free function value f (e, n, q, P, G) to the x which value f depends on the user unique identifying information e stored in the second memory means and also on the above n, q, P and G, and for generating as proof data a point R which takes the value r determined from point, as well as a positive integer s, the proof data generation means may generate an appropriate random number k, assume that the value determined from point R ($=$kP) obtained by multiplying the P by k on G is r, then use the authentication data m stored in the first memory means, as well as the above e, n, q, P, G and f (e, n, q, P, G), subtract the product of f (e, n, q, P, G) and r from m and multiply the resulting difference by the reciprocal of k, under the modulus n, to generate s {$=$[m$-$rf (e, n, q, P, G)] $k^{-1}$ mod n}, while the proof data verification means may generate an inverse element w ($=s^{-1}$ mod n) of s under the modulus n, further generate the value wr by multiplying the r by the w, the value wrt by multiplying the proof support information t stored in the third memory by the r and w, and the value wm by multiplying the m by the w, and verify that, on G, the value v determined from the value V ($=$wrY$+$wmP$-$wrtP) is equal to the r under the modulus n (v$=$r mod n) which value V results from subtracting the value obtained by multiplying the P by wrt from the sum of the value obtained by multiplying the Y by wr and the value obtained by multiplying the P by wm.

In an algebraic group G on a finite field $F_q$ with q elements, given that the point with an order of n is P, a unique security characteristic information is a positive integer x, and verification information Y corresponding to the x is a point (Y$=$xP) on G obtained by multiplying the P by x, then the proof support information t stored in the third memory is the data [t$=x^{-1}$ f (e, n, q, P, G) mod n] obtained by multiplying an inverse element $x^{-1}$ of the x by a non-conflictive function value f (e, n, q, P, G) which depends on the user unique identifying information e stored in the second memory means and also on the above n, q, P and G, under the modulus n, and for generating positive integers r an s as proof data, the proof data generation means may generate an appropriate random number k, assume that the value determined from point ($=$kP) obtained by multiplying the P by k on G is r, then use the authentication data m stored in the first memory means, as well as the above e, n, q, P, G and f (e, n, q, P, G), then subtract the product of f (e, n, q, P, G) and r from m and multiply the resulting difference by the inverse of k, under the modulus n, to generate s {$=$[m$-$rf(e, n, q, P, G)] $k^{-1}$ mod n}, while the proof data verification means, under the modulus n, may generate an inverse element w ($=s^{-1}$ mod n) of s, further generate the value wrt by multiplying the proof support information t stored in the third memory by the above r and w and the value wm by multiplying the above m by w, and verify that, on G, the value v determined from the value V ($=$wrtY$+$wmP) is equal to the above r under the modulus n (v$=$r mod n) which value V is the sum of the value obtained by multiplying the Y by wrt and the value obtained by multiplying the P by wm.

The authentication data may be an output h(r) provided the random number r generated by the random number generation means is an input to the non-conflictive function h.

The present invention can be implemented as a method, or at least a portion thereof can be made a software implementing mode.

DETAILED DESCRIPTION OF PREFERRED EMBODIMENTS

[Entire Configuration]

Before making reference to concrete embodiments of the present invention, a description will first be directed to an entire configuration in a mode for carrying out the invention.

Figure 1:
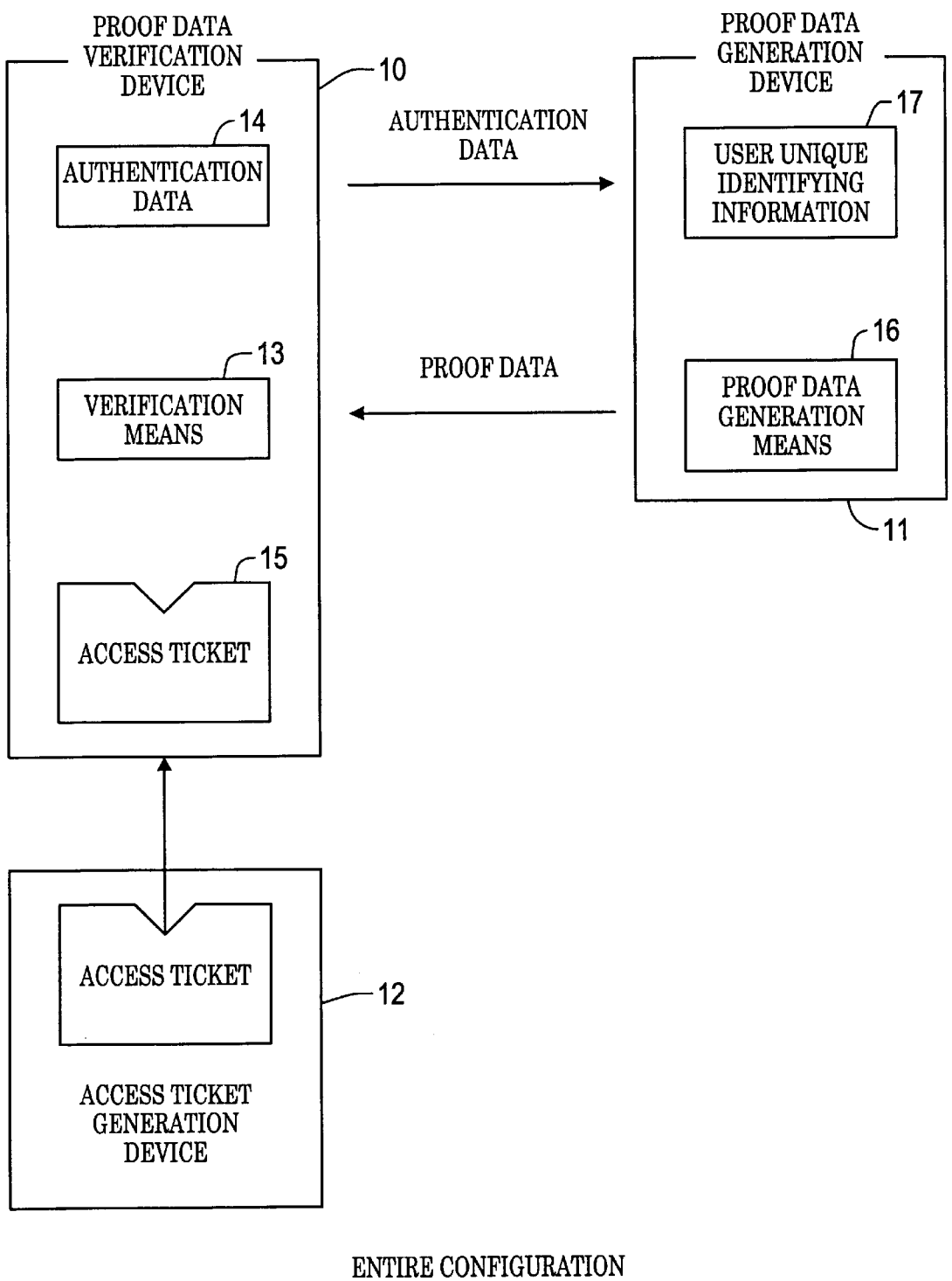
FIG. 1 is a block diagram showing an entire configuration of a mode for carrying out the present invention.

Reference will first be made to the case where the present invention is applied to execution control for an application program running on user's PC or work station. FIG. 1 shows the configuration of an associated system embodying the invention.

In FIG. 1, a program execution control device (user's access rights authentication device) includes a proof data verification device 10, a proof data generation device 11 and an access ticket generation device 12. The proof data verification device 10 is provided with a verification means 13 and holds authentication data 14 and proof support information (access ticket) 15. The proof data generation device 11 is provided with a proof data generation means 16 and holds a user unique identifying information 17. The access ticket generation device 12 generates the access ticket 15 and provides it to the proof data verification device 10. As to the access ticket 15, a detailed description thereof will be given later.

The proof data verification device 10 sends the authentication data 14 to the proof data generation device 11. The proof data generation means 16 in the proof data generation device 11 generates proof data from the received authentication data 14 and the user unique identifying information 17 which it holds, and sends the proof data thus generated back to the proof data verification device 10. The verification means 13 in the proof data verification device 10 verifies the proof data by use of both the authentication data 14 and the access ticket 15, and if the verification is successful, the execution of program is permitted.

In this mode, the proof data generation device 11 can be realized as a proof program on the user's computer. In this case, if the user can copy the user unique identifying information 17 and distribute the copies, it follows that even users not possessing a legitimate utilization right are allowed to use the application program. Therefore, the user unique identifying information 17 is loaded in the computer so as not to permit stealing thereof even by the user who is the legitimate holder thereof and it is possible to use proof hardware (e.g. IC card or board) having an anti-tamper characteristic. The use of such a portable hardware as IC card is convenient in the case where the user works on plural PCs or work stations.

The proof data verification device 10 is constituted as part of the application program utilized by the user. More specifically, when the user starts the application program on a PC or a work station, the proof data verification device 10 described as program in the application program is started and there is made communication with the proof data generation device 11 to effect user authentication. Only when the communication is terminated correctly, the execution of the application program is made possible.

In order for the user to utilize the application program embedded in the proof data verification device 10, it is necessary for the user to acquire proof support information (access ticket) 15 issued for the user and corresponding to the application program. The user then registers the thus-acquired access ticket 15 in a proof data generation program installed on the PC or work station. For example, where the user unique identifying information is sealed in an IC card, the user loads the IC card on the PC or work station. It is optional whether the access ticket 15 is to be placed on the PC or work station or is to be placed in the IC card.

The proof data generation device 11 (constituted by both a program on a PC or work station and an IC card) performs calculation on the basis of the user unique identifying information 17 and communicates with the proof data verification device 10 on the basis of the calculation. The user unique identifying information 17 is used in the course of the proof data calculation in the proof data generation device 11, but if the information 17 leaks to the exterior, there arises a problem, so it is necessary that at least a part of the above program be protected by a defensive means such as an IC card or the like.

It is only when the user unique identifying information, the access ticket 15 and the unique security characteristic information verified by the proof data verification device 10 are correctly correlated with one another that the authentication by the proof data verification device 10 becomes successful as a result of the communication.

If either the user unique identifying information 17 or the access ticket 15 is absent, the authentication will not be successful.

The access ticket 15is issued for a specific user. That is, the user unique identifying information 17 of a specific user is used at the time of generation of the access ticket. When the user unique identifying information 17 used in generating the access ticket 15 and the user unique identifying information 17 used by the proof data generation device 11 are not coincident with each other, the authentication will not be successful, either.

The access ticket 15 is generated on the basis of specific unique security characteristic information, and the proof data verification device 10 is constituted so as to authenticate the unique security characteristic information. Therefore, also when the characteristic information underlying the generation of the access ticket 15 and the characteristic information to be authenticated by the proof data verification device 10 embedded in the application program are not correlated with each other, the authentication will not be successful.

It is possible to omit the user's trouble of receiving the access ticket. For example, if the access ticket is affixed to the application program at the time of delivery of the same program to each user, it is possible to save the trouble of separately distributing the access ticket to the user. Using the thus-affixed access ticket, the proof data verification device 10 makes verification.

There may also be adopted a method wherein the application program is executed on another computer connected through a network and the results of the execution are communicated to the user's computer through the network. This configuration is based on what is called a server-client model. In the previous execution control for the application program which is executed on the user's PC or work station, the communication between the proof data generation device 11 and the proof data verification device 10 is carried out as what is called inter-process communication. But in the configuration based on the server-client model, the communication between the proof data generation device 11 and the proof data verification device 10 is carried out as communication which follows a network protocol such as TCP/IP (transmission control protocol/internet protocol).

Also when the application program is constructed on a dedicated device, the present invention is applicable. For example, the whole of the proof data generation device 11 is mounted in an IC card (the access ticket acquired is also registered in the IC card) and the proof data verification device 10 is mounted on the above dedicated device, but since the dedicated device has a slot for insertion of the IC card, the user inserts his or her IC card into the slot to effect authentication.

The configuration using such a dedicated machine can be applied to ATMs in a bank or game machines in game arcades.

As methods for the user to acquire the access ticket 15 there are a method wherein a common center for the issuance of access ticket 15 generates and distributes the access ticket in response to the user's request for issuance and a method wherein an application programmer generates the access ticket each independently with the aid of an access ticket issuing program or the access ticket generation device 12.

In such a case, the access ticket generation device 12 is managed by a ticket issuer, and by such a legitimate right holder the access ticket is prepared and distributed independently of the user's environment.

The access ticket 15 thus generated may be delivered to the associated user through a portable storage medium such as floppy disk, or may be delivered through a network using an electronic mail or the like because the access ticket 15 is safe enough.

That the access ticket 15 is very safe is based on the following two properties.

1) The access ticket 15 is a signing type ticket. More specifically, only the user to whom an access ticket has been issued (to be exact, the person who possesses the user unique identifying information 17 which was used in the generation of the access ticket 15) can properly operate the proof data verification device 10 by use of the access ticket 15. Therefore, even if an ill-willed third party acquires the access ticket 15 of another user illegally, it is impossible for the third party to utilize the access ticket 15 unless he or she acquires the user unique identifying information of the regular user to whom the access ticket 15 has been issued.

2) The access ticket 15 possesses more strict safety. More specifically, even if an ill-willed third party collects a certain number of access tickets 15 and makes any analysis, it is impossible to forge another access ticket on the basis of the information obtained or constitute such a device as imitates the operation of the proof data verification device 10 to effect authentication.

A more concrete configuration of the present invention will be described below by way of embodiments thereof.

[First Embodiment]

In the first embodiment there will be shown a configuration example of using an access ticket in ElGamal signature.

Figure 2:
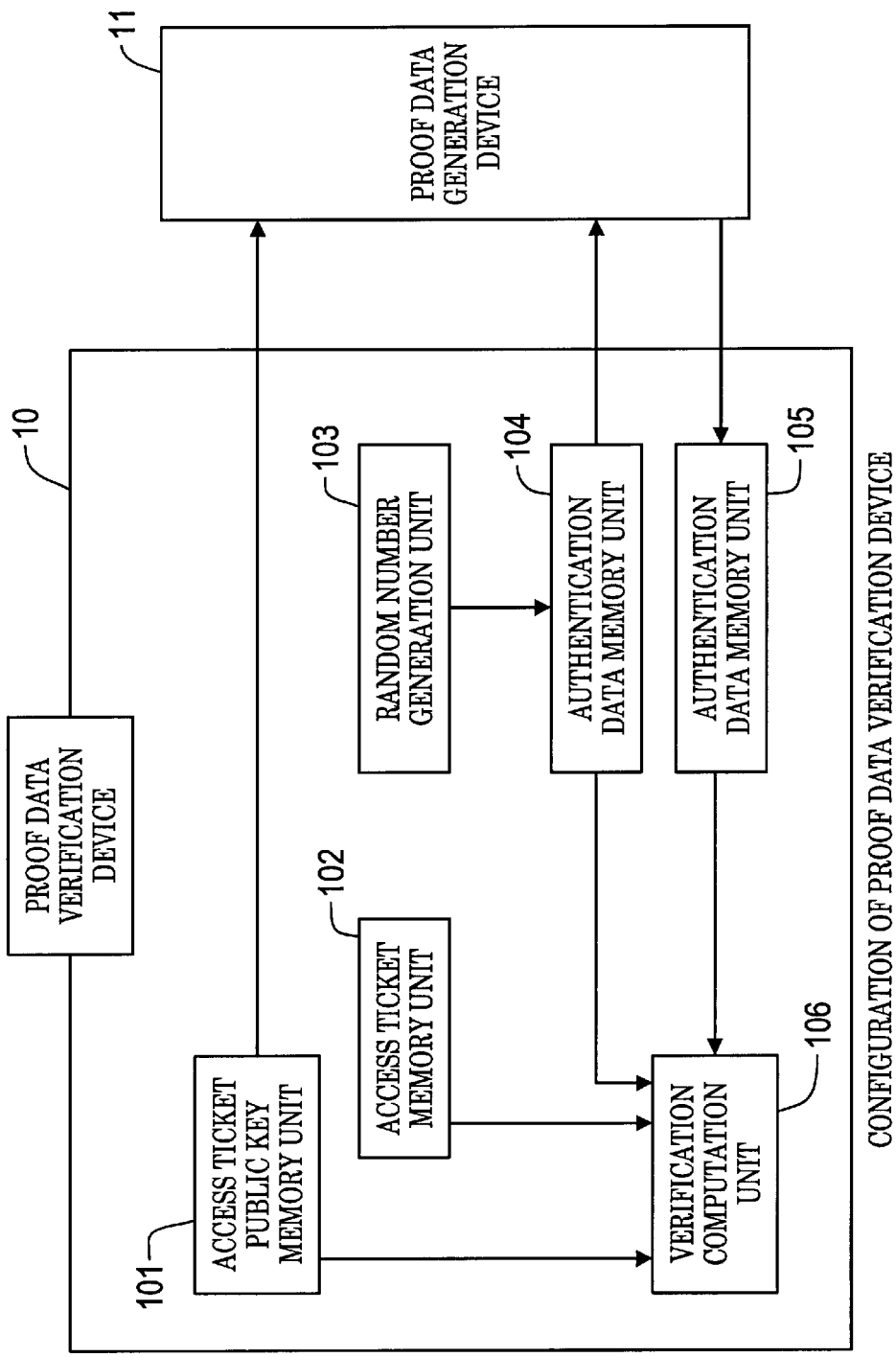
FIG. 2 is a block diagram showing the configuration of a proof data verification device according to the present invention.
Figure 3:
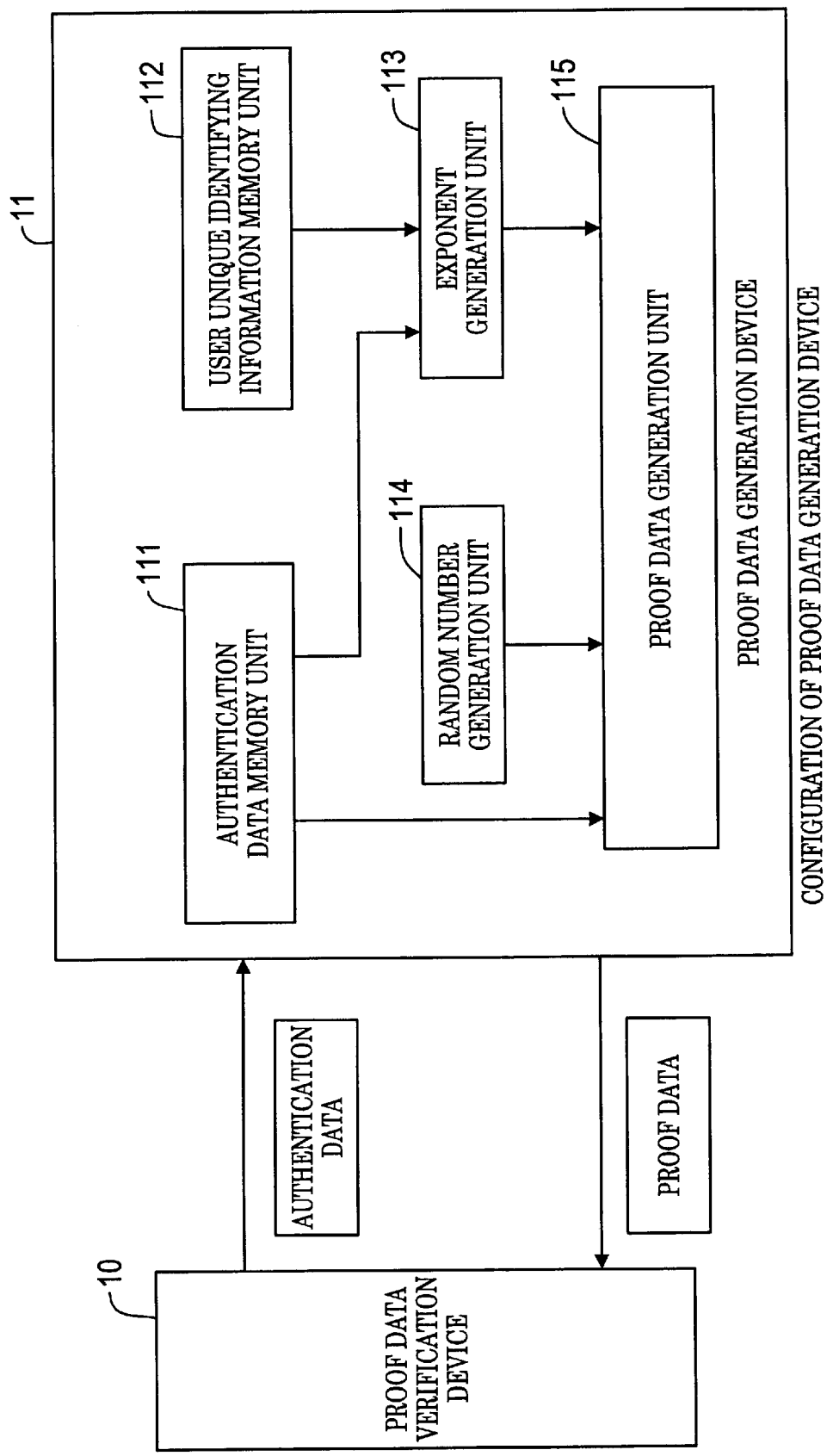
FIG. 3 is a block diagram showing the configuration of a proof data generation device according to the present invention.
Figure 4:
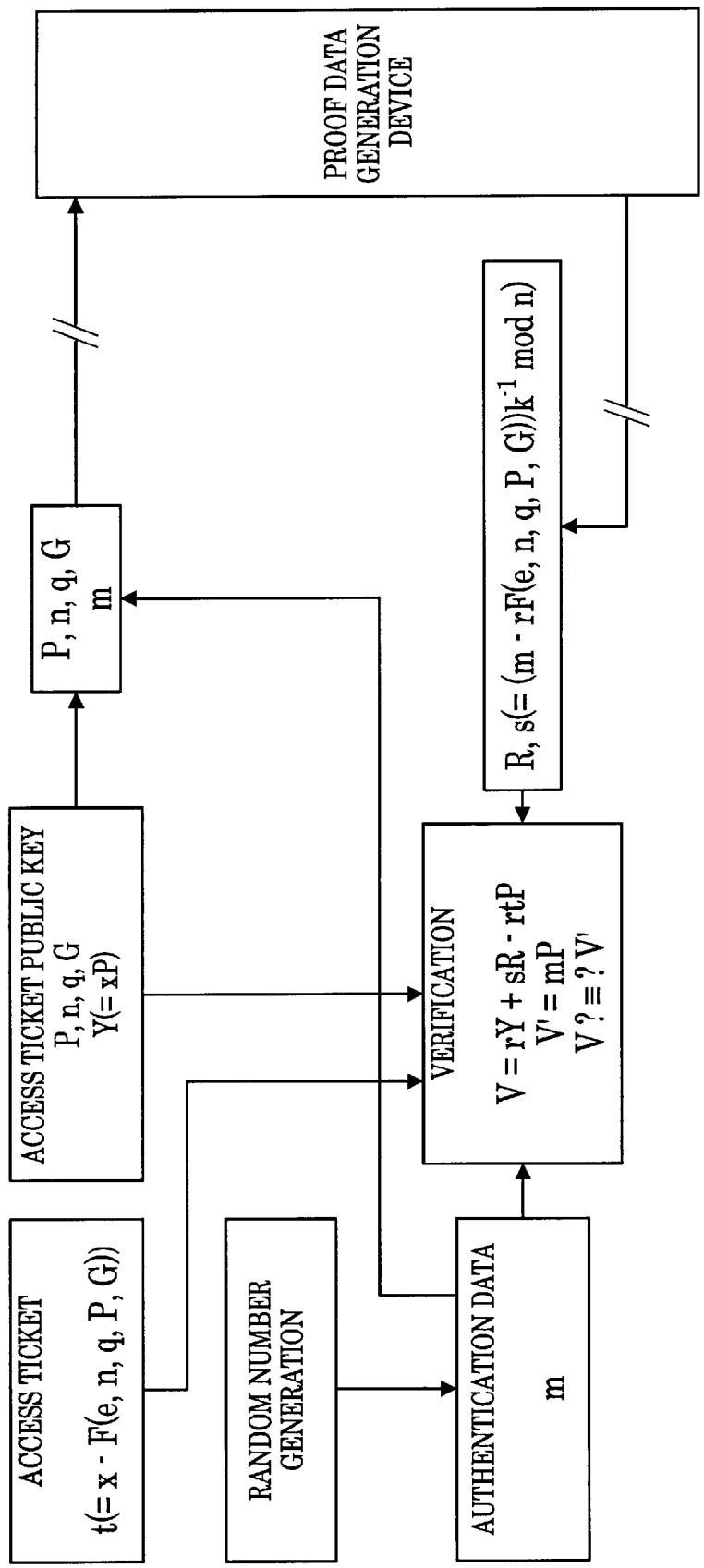
FIG. 4 is a diagram showing the operation of a proof data verification device used in the first embodiment of the present invention.
Figure 14:
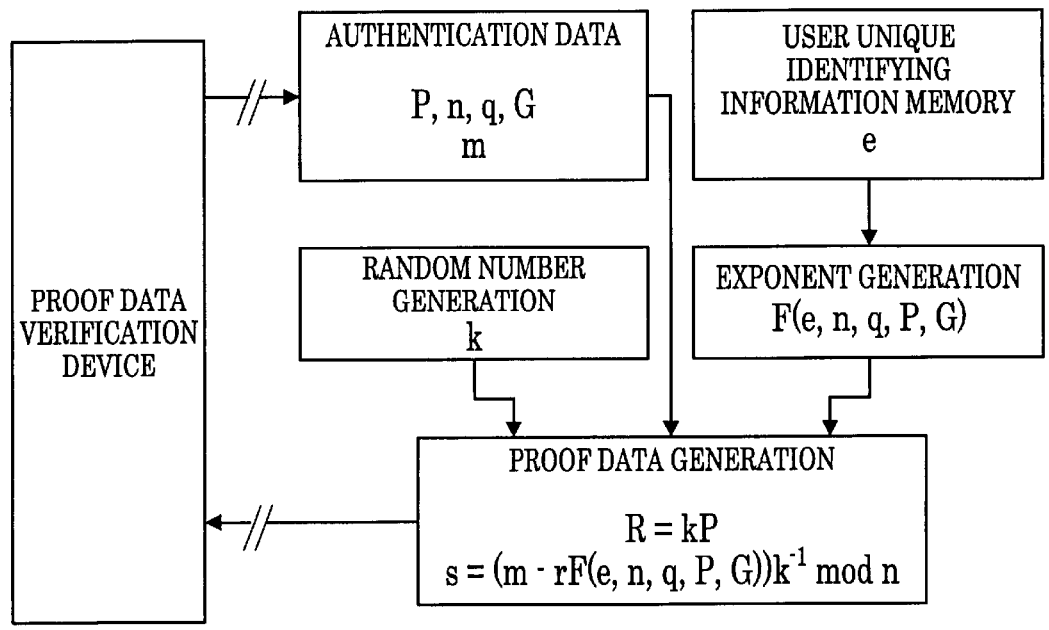
FIG. 14 is a diagram showing the operation of a proof data generation device used in the first and second embodiments.

A method for configuring a verification device in this embodiment is shown in FIG. 2 and a method for configuring a proof data generation device is shown in FIG. 3. Further, the operation of the verification device is shown in FIG. 4 and that of the proof data generation device is shown in FIG. 14.

In FIG. 2, a proof data verification device 10 comprises an access ticket public key memory unit 101, an access ticket memory unit 102, a random number generation unit 103, an authentication data memory unit 104, an authentication data memory unit 105, and a verification computation unit 106. The operations of the components of the proof data verification device 10 and the flow of data are as shown in FIG. 4. As to the details of the operations, reference will be made thereto later.

In FIG. 3, the proof data generation device 11 comprises an authentication data memory unit 111, a user unique identifying information memory unit 112, an exponent generation unit 113, a random number generation unit 114, and a proof data generation unit 115. The operations of the components of the proof data generation device 11 and the flow of data are as shown in FIG. 14. The details of the operations will be described later.

A description is now directed to the details of authentication in this embodiment.

In this first embodiment, unique security characteristic information x and verification information Y for the x are in the following relation. For an algebraic group G on a finite field $F_q$ with q elements and a point P with an order of n on G, both x and Y satisfy the following expression (1-1):

[Expression 1]

$$Y=xP \tag{1-1}$$

The above q, G, Y, P and n are stored in the access ticket public key memory unit 101.

The algebraic group on the finite field $F_q$ represents a subgroup of a general linear group $GL_n$ ($F_q$) constituted by the whole of an invertible matrix which comprises components of $F_q$ coefficient. Examples are multiplicative group $GL_1$ ($F_q$) of $F_q$ and a special linear group $SL_n$ ($F_q$) with a determinant constituted by one matrix. Also as to a direct product (algebraic torus) of plural multiplicative groups, it can be implemented as an algebraic group by a diagonal embedding in a general linear group.

Next, for identifying each user, user unique identifying information e, which is different for each user, is determined. The information e is stored in the user unique identifying information memory unit 112.

Access ticket t is generated in accordance with the following expression (1-2). It is here assumed that the trueness of t has been proved by a predetermined method.

[Expression 2]

$$t=x-F(e, n, q, P, G) \tag{1-2}$$

Alternatively, the value of t may be determined under the modulus n as in the following expression (1-3):

[Expression 3]

$$t=x-F(e, n, q, P, G) \bmod n \tag{1-3}$$

Function F is a function unlikely to cause conflict of function values. For example, it can be determined like the following expression (1-4) or (1-5) using a one-way hash function h:

[Expression 4]

$$F(x, y) = h(x|y) \quad (1\text{-}4)$$

$$F(x, y, z, u, w) = h(x|y|z|u|w) \quad (1\text{-}5)$$

where x| y stands for a bit connection of x and y.

The one-way hash function is a function having the property that it is extremely difficult to calculate different x and y which satisfy the relationship of h(x)=h(y). As examples of the one-way hash function there are known MD2, MD4 and MD5 defined by RSA Data Security Inc., as well as SHS (Secure Hash Standard) defined by the U.S. Federal Government.

In the following description, the data m which the proof data verification device 10 generates for authentication will be referred to as authentication data, while the data which the proof data generation device generates for proof will be referred to as a signature for proof data or authentication data. In this embodiment, the generation and verification of signature are performed in accordance with ElGamal signature.

The operation of this embodiment will be described below.

[Step 1]

The proof data verification device 10 is started when the user accesses digital contents which require authentication by the user's access rights authentication device.

In the case where the proof data verification device 10 is constituted as part of an application program which runs on the user's PC or work station, the application program is started by a conventional method in which the user employs an indicating means such as the keyboard or the mouse. When the execution of the application program reaches the program which constitutes the proof data verification device 10, the operation of the device 10 is started.

Where the proof data verification device 10 is constituted on another PC or work station (called server) connected through a network, the user starts a communication program on his or her PC or work station. The proof data verification device 10 on the server is started upon request for opening of communication to the server which request is made by the communication program in accordance with a predetermined procedure. For example, when the user communication program intends to follow a procedure called TCP/IP at the time of communication with the server, the proof data verification device 10 is made corresponding to a specific port of the server in advance and setting is made so that the user communication program designates the port and requests the server for TCP connection, whereby it becomes possible for a demon (inetd) on the server to start the proof data verification device 10 in response to the TCP connection request. Such an implementing method is widely utilized in such a network as internet.

It is also possible to make the proof data verification device 10 into a device for a special purpose. For example, the proof data verification device 10 may be constituted as a program printed to a ROM in an IC card reader-writer; that is, it can be made a program loaded in a microcontroller of an IC card. In this case, when the user inserts the IC card into the reader-writer, the proof data verification device 10 is started.

[Step 2]

The proof data verification device 10 generates authentication data m and stores it in the authentication data memory unit 104. The authentication data m is generated so as to take a different value at every generation. In this embodiment, the proof data verification device 10 has the random number generation unit 103, and a random number generated by the random number generation unit 103 is stored as authentication data m into the authentication data memory unit 104.

Further, the authentication data m, the parameters q and G for defining the algebraic group G which are stored in the access ticket public key memory unit 101, as well as the point P and the order n, are stored in the authentication data memory unit 111 included in the proof data generation device 11.

[Step 3]

The random number generation unit 114 in the proof data generation device 11 generates an appropriate random number k, while the proof data generation unit 115 multiplies point P stored in the authentication memory unit 111 by k to generate point R on G. The point R satisfies the following expression (1-6):

[Expression 5]

$$R = kP \quad (1\text{-}6)$$

[Step 4]

The exponent generation unit 113 in the proof data generation device 11 acquires the user unique identifying information e stored in the user unique identifying information memory unit 112 and the q, G, P, n stored in the authentication data memory unit 111, and performs calculation of the following expression (1-7):

[Expression 6]

$$F(e, n, q, P, G) \quad (1\text{-}7)$$

[Step 5]

The proof data generation unit 115 in the proof data generation device 11 acquires the authentication data m stored in the authentication data memory unit 111 and then performs calculation of the following expression (1-8) to obtain s, using the authentication data m, a value determined from R calculated in accordance with the expression (1-6) in step 3, and further using the data generated in the exponent generation unit 113:

[Expression 7]

$$s = [m - rF(e, n, q, P, G)]k^{-}\text{mod } n \quad (1\text{-}8)$$

[Step 6]

The proof data generation device 11 sends s and R back to the authentication data memory unit 105 in the proof data verification device 10.

[Step 7]

The verification computation unit 106 in the proof data verification device 10 acquires verification information Y and point P from the access ticket public key memory unit 101, also acquires the access ticket t stored in the access ticket 102, and performs calculation of the following expression (1-9):

[Expression 8]

$$V = rV + sR - rtP \quad (1\text{-}9)$$

[Step 8]

The verification computation unit 106 acquires authentication data m from the authentication data memory unit 104 and point P from the access ticket public key memory unit 101 and performs calculation of the following expression (1-10):

[Expression 9]

$$V' = mP \quad (1\text{-}10)$$

Only when the combination of the access ticket t used in the proof data verification device 10 with the user unique identifying information e is correct, the values V and V' obtained by the respective calculations coincide with each other and verification is effected correctly.

[Second Embodiment](ElGamal, an Example of a Different Ticket)

A description is now directed to the second embodiment of the present invention. In this second embodiment, which is a modification of the above first embodiment, the method for constructing ElGamal signature, how to generate the authentication data m, properties to be satisfied, and how to generate the signature to the authentication data in the proof data generation device 11, are the same as in the previous first embodiment. However, an access ticket t used in this second embodiment is generated in accordance with the following expression (2-1):

[Expression 10]

$$t = x^{-1} F(e, n, q, P, G) \bmod n \qquad (2\text{-}1)$$

Figure 5:
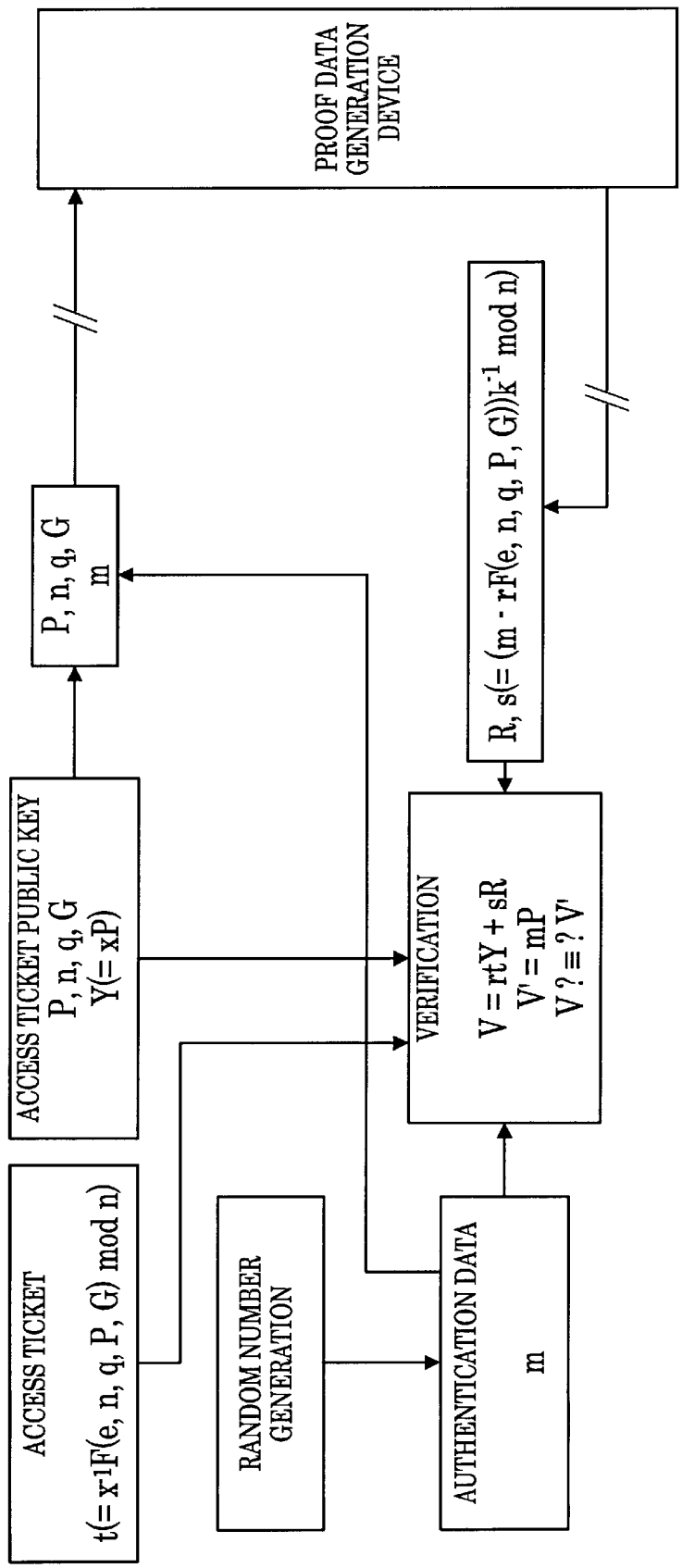
FIG. 5 is a diagram showing the operation of a proof data verification device used in the second embodiment of the invention.

In this second embodiment, the operation of a proof data verification device 10 is shown in FIG. 5 and that of a proof data generation device 11 is shown in FIG. 14. The configurations of the devices 10 and 11 are the same as in the first embodiment (see FIGS. 2 and 3).

The operation of this second embodiment will be described below.

[Step 1]

The operation of the proof data verification device 10 is started upon access by a user.

[Step 2]

The proof data verification device 10 generates a random number in the random number generation unit 103, which random number is then stored as authentication data m in the authentication data memory unit 104. Further, the authentication data m, parameters q and G stored in the access ticket public key memory unit 101 to define the algebraic group G, and the foregoing point P and order n, are stored in the authentication data memory unit 111 included in the proof data generation device 11.

[Step 3]

The proof data generation unit 115 in the proof data generation device 11 performs calculation of the following expressions (2-2) and (2-3) to obtain R and s in accordance with the same procedures as steps 3, 4 and 5 in the first embodiment:

[Expression 11]

$$R = kP \qquad (2\text{-}2)$$

$$s = [m - rF(e, n, q, P, G)] k^{-1} \bmod n \qquad (2\text{-}3)$$

[Step 4]

The proof data generation device 11 sends the s and R back to the authentication data memory unit 105 in the proof data verification device 10.

[Step 5]

The verification computation unit 106 in the proof data verification device 10 acquires verification information Y and point P from the access ticket public key memory unit 101, further acquires the access ticket t stored in the access ticket memory unit 102, and performs calculation of the following expression (2-4):

[Expression 12]

$$V = rtY + sR \qquad (2\text{-}4)$$

[Step 6]

The verification computation unit 106 acquires authentication data m from the authentication data memory unit 104 and point P from the access ticket public key memory unit 101 and performs calculation of the following expression (2-5):

[Expression 13]

$$V' = mP \qquad (2\text{-}5)$$

Only when the combination of the access ticket t used in the proof data verification device 10 with the user unique identifying information e is correct, the values V and V' both obtained by the respective calculations coincide with each other and verification is effected correctly.

[Third Embodiment](ElGamal, an Example of a Different Argument of f)

A description is now directed to the third embodiment of the present invention. In this third embodiment, which is also a modification of the first embodiment, the method for constructing ElGamal signature, how to generate authentication data m, properties to be satisfied, and how to generate the signature to the authentication data in the proof data generation device, are the same as in the first embodiment. The parameters to define the algebraic group G and the point P on G are common in all of the proof data generation device 11 and the proof data verification device 10 and are stored in an area capable of being accessed from the exponent generation unit 113 and the proof data generation unit 15 in the proof data generation device 11.

In this embodiment, the access ticket t is generated from the unique security characteristic information, verification information, and user unique identifying information in accordance with the following expression (3-1)

[Expression 14]

$$t = x - F(e, Y) \qquad (3\text{-}1)$$

Alternatively, the value of t may be determined under the modulus n as in the following expression (3-1'):

[Expression 15]

$$t = x - F(e, Y) \bmod n \qquad (3\text{-}1')$$

Figure 6:
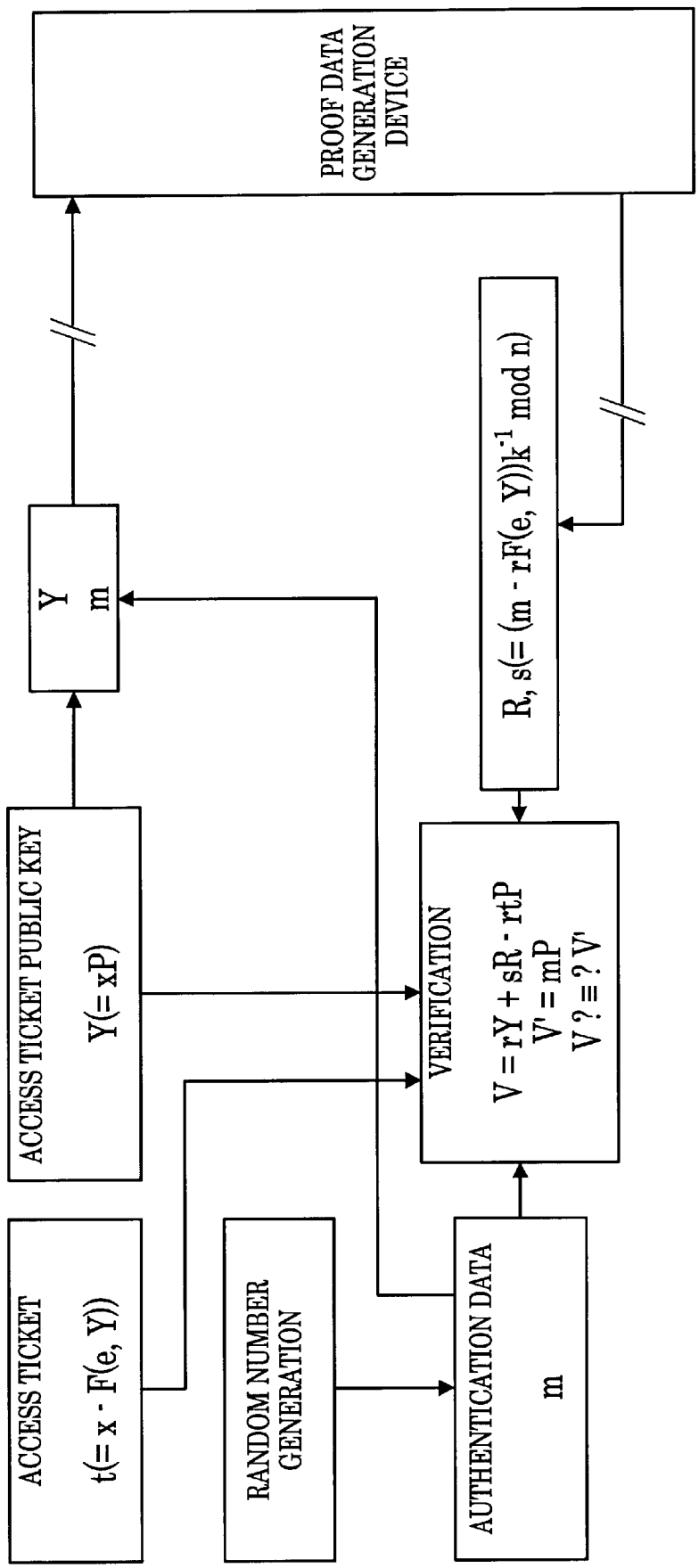
FIG. 6 is a diagram showing the operation of a proof data verification device used in the third embodiment of the invention.
Figure 15:
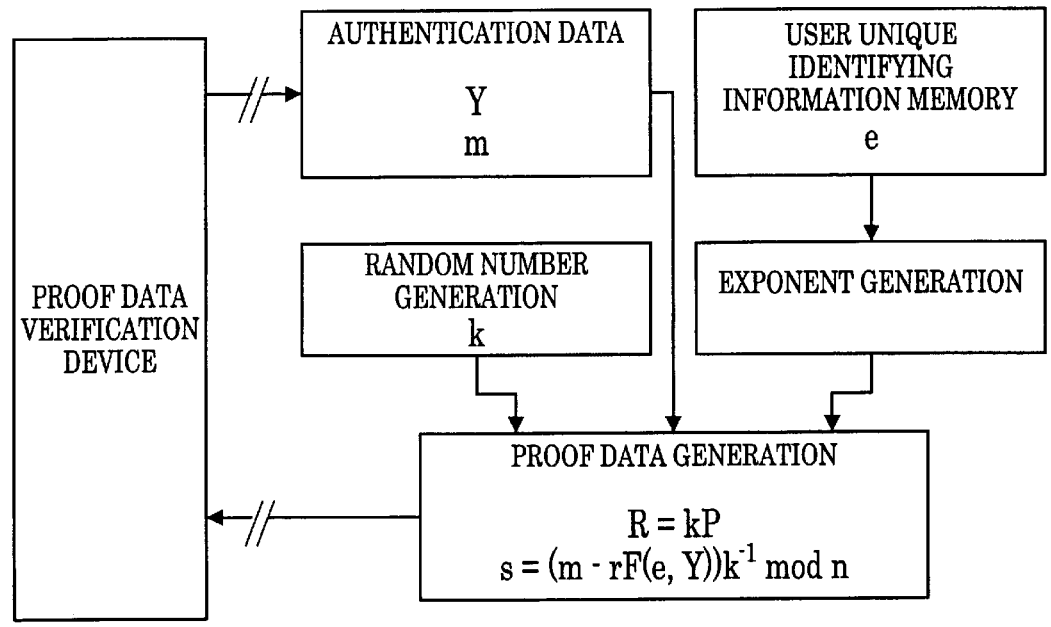
FIG. 15 is a diagram showing the operation of a proof data generation device used in the third embodiment.

The operation of the proof data verification device 10 and that of the proof data generation device 11 in this embodiment are shown in FIGS. 6 and 15, respectively. The configurations of both devices 10 and 11 are the same as in the first embodiment (see FIGS. 2 and 3).

The following description is now provided about the operation of this embodiment.

[Step 1]

The proof data verification device is turned ON upon user access.

[Step 2]

In the proof data verification device 10, a random number is generated by the random number generation unit 103 and is stored as authentication data m in the authentication data memory unit 104. Further, the authentication data m and verification information Y are stored in the authentication data memory unit 111 in the proof data generation device 11.

[Step 3]

In the proof data generation device 11, the random number generation unit 114 generates an appropriate random number k, and the proof data generation unit 115 multiplies the point P stored in the authentication data memory unit 111 by k to generate point R on G, which point R satisfies the following expression (3-2):

[Expression 16]

$$R = kP \qquad (3\text{-}2)$$

[Step 4]

The exponent generation unit 13 in the proof data generation device 11 acquires the user unique identifying information e stored in the user unique identifying information memory unit 112 and the verification information Y stored in the authentication memory unit 111, and performs calculation of the following expression (3-3):

[Expression 17]

$$F(e, Y) \qquad (3\text{-}3)$$

[Step 5]

The proof data generation unit 115 in the proof data generation device 11 acquires the authentication data m stored in the authentication data memory unit 111 and performs calculation of the following expression (3-4) to obtain s, using the authentication data m, a value determined from R which was generated in accordance with the expression (3-2) in step 3, and further using the data generated in the exponent generation unit 113:

[Expression 18]

$$s = [m - rF(e, Y)]k^{-} \bmod n$$

[Step 6]

The proof data generation device 11 sends s and R back to the authentication data memory unit 105 in the proof data verification device 10.

[Step 7]

The verification computation unit 106 in the proof data verification device 10 acquires the verification information Y and point P from the access ticket public key memory unit 101 and further acquires the access ticket t stored in the access ticket memory unit 102, then performs calculation of the following expression (3-5):

[Expression 19]

$$V = rY + sR - rtP \qquad (3\text{-}5)$$

[Step 8]

The verification computation unit 106 acquires the authentication data m from the authentication data memory unit 104 and point P from the access ticket public key memory unit 101, then performs calculation of the following expression (3-6):

[Expression 20]

$$V' = mP \qquad (3\text{-}6)$$

Only when the combination of the access ticket t used in the proof data verification device 10 with the user unique identifying information e is correct, the values of V and V' obtained as a result of the calculations coincide with each other and verification is effected correctly.

Also in this embodiment there may be adopted the same ticket form as in the second embodiment, as shown in the following expression (3-7):

[Expression 21]

$$t = x^{-1} F(e, Y) \bmod n$$

In this case, the proof data generation device 11 performs the same calculations as the expressions (3-2), (3-3) and (3-4), while the proof data verification device 10 performs the same calculations as the expressions (2-4) and (2-5) to verify the signature.

[Fourth Embodiment]

A description is now directed to the fourth embodiment of the present invention. In this embodiment, access ticket t is utilized in connection with Nyberg-Rueppel signature.

Figure 7:
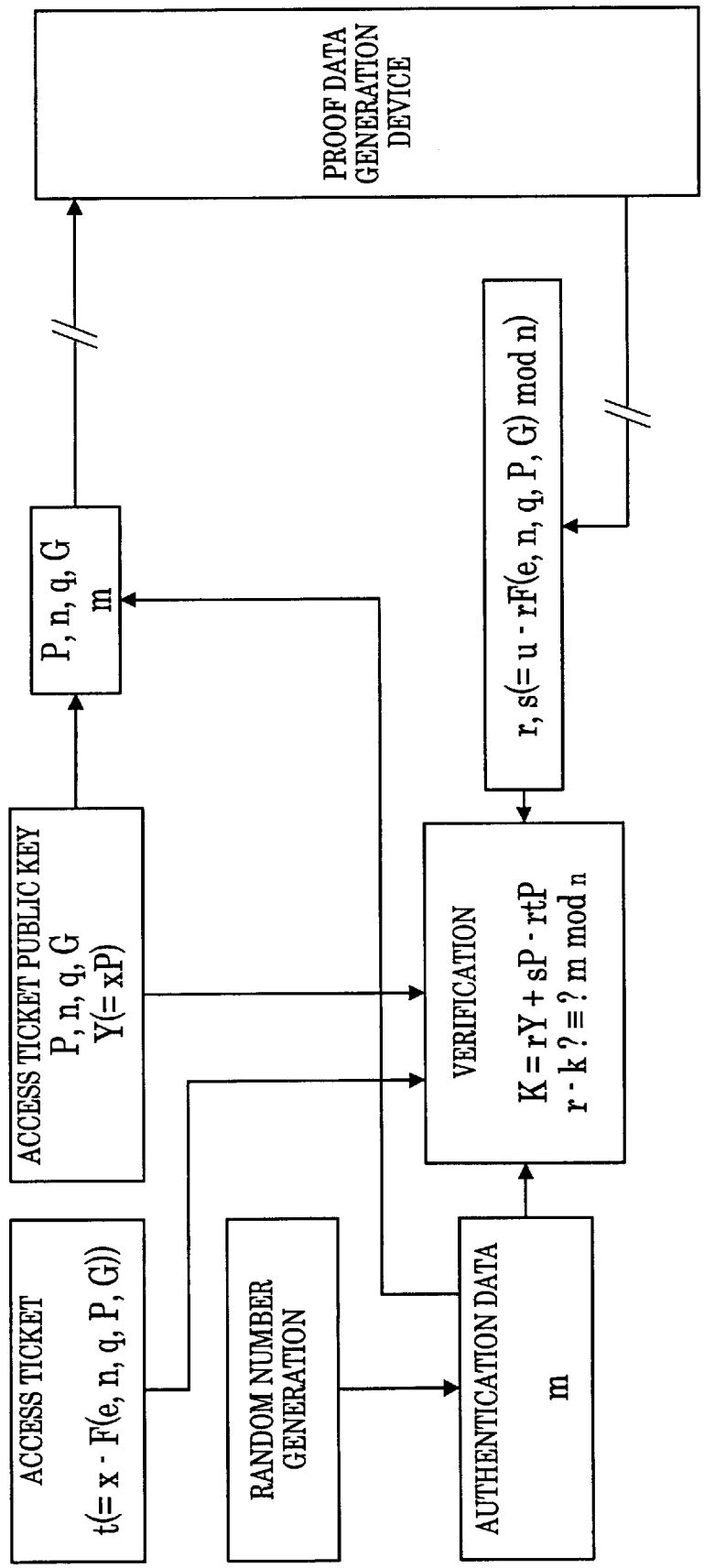
FIG. 7 is a diagram showing the operation of a proof data verification device used in the fourth embodiment of the invention.
Figure 16:
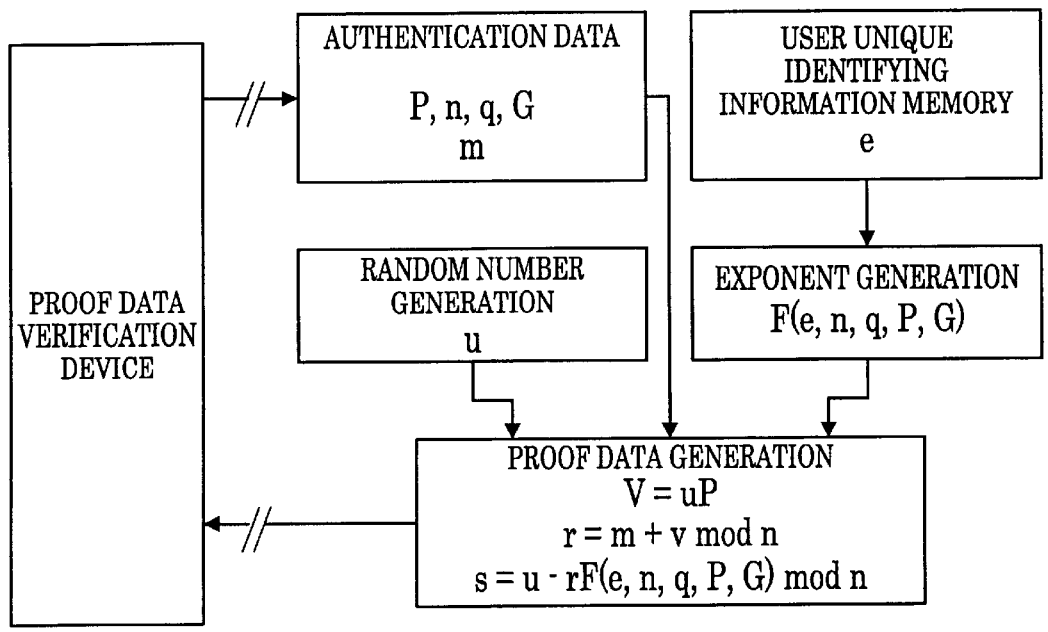
FIG. 16 is a diagram showing the operation of a proof data generation device used in the fourth embodiment.

In this fourth embodiment, the operation of the proof data verification device 10 and that of the proof data generation device 11, which are of the same configurations as in the first embodiment (see FIGS. 2 and 3), are shown in FIGS. 7 and 16, respectively.

In this embodiment, the unique security characteristic information x and verification information Y corresponding to the x are in such a relation as they satisfy the following expression (4-1) with respect to an algebraic group G on a finite field $F_q$ having q number of elements and point P with an order of n on G:

[Expression 22]

$$Y = xP \qquad (4\text{-}1)$$

The above q, G, Y, P and n are stored in the access ticket public key memory unit 101.

Further, for identifying each user, there is determined user unique identifying information e which is a number different for each user and which is stored in the user unique identifying information memory unit 112. The access ticket t is generated in accordance with the following expression (4-2):

[Expression 23]

$$t = x - F(e, n, q, P, G) \qquad (4\text{-}2)$$

Alternatively, the value of t may be determined under the modulus n as in the following expression (4-3):

[Expression 24]

$$t = x - F(e, n, q, P, G) \bmod n \qquad (4\text{-}3)$$

In this embodiment, the generation and verification of signature are effected in conformity with Nyberg-Rueppel signature.

The operation of this embodiment will be described below.

[Step 1]

The proof data verification device 10 is turned ON upon user access.

[Step 2]

In the proof data verification device 10, a random number is generated by the random number generation unit 103 and is stored as authentication data m in the authentication data memory unit 104. Further, the authentication data m, parameters q and G stored in the access ticket public key memory unit 101 to define the algebraic group G, as well as the foregoing point P and order n, are stored in the authentication data memory unit 111 included in the proof data generation device 11.

[Step 3]

In the proof data generation device 11, the random number generation unit 114 generates an appropriate random number u, while the proof data generation unit 115 multiplies the point P stored in the authentication data memory unit 111 by u to generate a point V on G, which point satisfies the following expression (4-4):

[Expression 25]

$$V = uP \qquad (4\text{-}4)$$

[Step 4]

Further, the proof data generation unit 11 acquires the authentication data m stored in the authentication data memory unit 111, then using the authentication data m and the value v determined from V, performs calculation of the following expression (4-5) to obtain r:

[Expression 26]

$$r = m + v \bmod n \quad (4\text{-}5)$$

[Step 5]

The exponent generation unit 113 in the proof data generation device 11 acquires the user unique identifying information e stored in the user unique identifying information memory unit 112 and also acquires q, G, P and n stored in the authentication data memory unit 111, then performs calculation of the following expression (4-6):

[Expression 27]

$$F(e, n, q, P, G) + tm \quad (4\text{-}6)$$

[Step 6]

Using the data generated in the exponent generation unit 113 and also using r and u, the proof data generation unit 11 performs calculation of the following expression (4-7) to obtain s:

[Expression 28]

$$s = u - rF(e, n, q, P, G) \bmod n \quad (4\text{-}7)$$

[Step 7]

The proof data generation device 11 sends s and R back to the authentication data memory unit 105 in the proof data verification device 10.

[Step 8]

The verification computation unit 106 in the proof data verification device 10 acquires verification information Y and P from the access ticket public key memory unit 101, also acquires the access ticket t stored in the access ticket memory unit 102, and performs calculation of the following expression (4-8):

[Expression 29]

$$K = rY + sP - rtP \quad (4\text{-}8)$$

[Step 9]

The verification computation unit 106 acquires the authentication data m from the authentication data memory unit 104 and verifies whether the value k determined from K, as well as r and m, satisfy the following relationship (4-9):

[Expression 30]

$$r - k \equiv m \pmod{n} \quad (4\text{-}9)$$

Only when the combination of the access ticket t used in the proof data verification device 10 with the user unique identifying information e is correct, a congruent expression of the expression (4-9) is valid and verification is effected correctly.

[Fifth Embodiment]

Reference will now be made to the fifth embodiment of the present invention, which is a modification of the fourth embodiment. In this fifth embodiment, the method for constructing Nyberg-Rueppel signature, how to generate authentication data m, properties to be satisfied, and how to generate the signature to the authentication data in the proof data generation device 11, are the same as in the fourth embodiment. However, the parameters which define the algebraic group G, as well as the point P on G, are common in all of the proof data generation device 11 and the proof data verification device 10 and are stored in an area capable of being accessed from the exponent generation unit 113 and proof data generation unit 115 in the proof data generation device 11.

In this embodiment, the access ticket t is generated in accordance with the following expression (5-1):

[Expression 31]

$$t = x - F(e, Y) \bmod n \quad (5\text{-}1)$$

Figure 8:
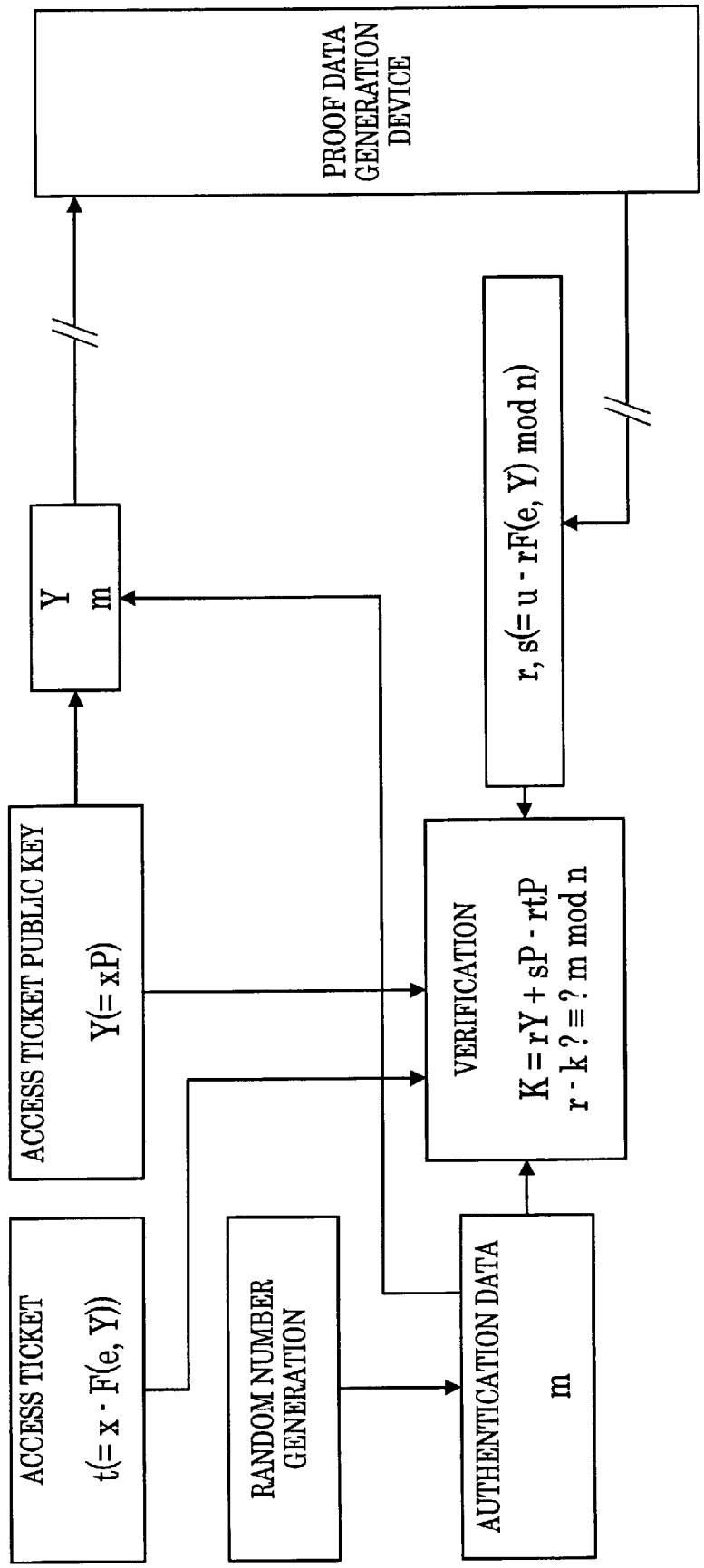
FIG. 8 is a diagram showing the operation of a proof data verification device used in the fifth embodiment of the invention.
Figure 17:
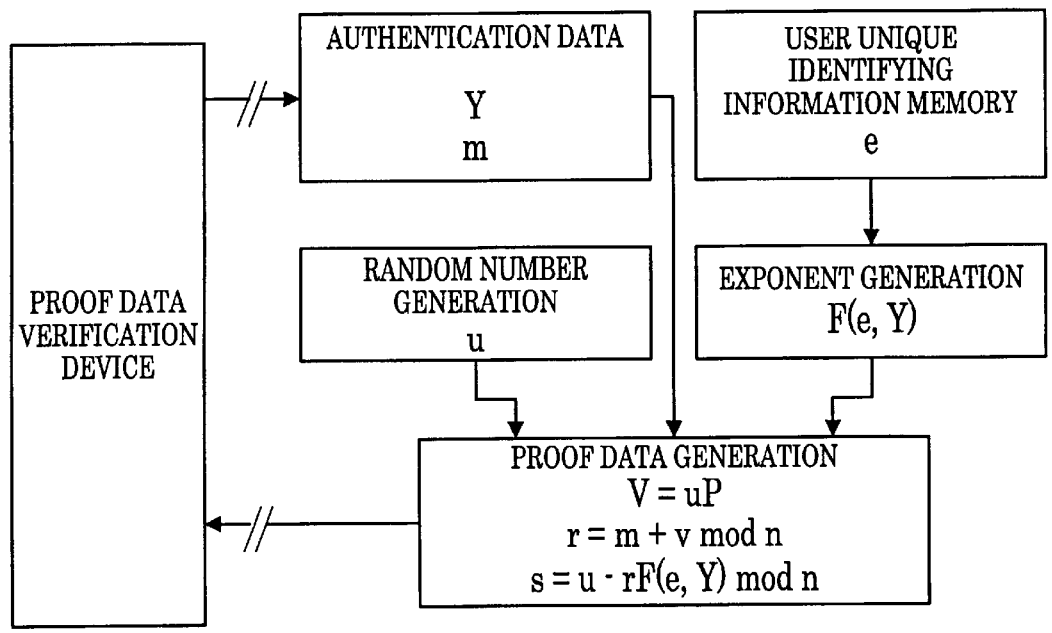
FIG. 17 is a diagram showing the operation of a proof data generation device used in the fifth embodiment.

The proof data verification device 10 and the proof data generation device 11 used in this embodiment are of the same configurations as in the first embodiment (see FIGS. 2 and 3) and the operations of the devices 10 and 11 are shown in FIG. 8 and 17, respectively.

The following description is now provided about the operation of this embodiment.

[Step 1]

The proof data verification device 10 is turned ON upon user access.

[Step 2]

In the proof data verification device 20, a random number is generated by the random number generation unit 103 and is stored as authentication data m in the authentication data memory unit 104. Further, the authentication data m and verification information Y are stored in the authentication memory unit 111 included in the proof data generation device 11.

[Step 3]

In the proof data generation device 11, the random number generation unit 114 generates an appropriate random number u, while the proof data generation unit 115 multiplies the point P stored in the authentication data memory unit 11 by u to generate a point V on G, which point V satisfies the following expression (5-2):

[Expression 32]

$$V = uP \quad (5\text{-}2)$$

[Step 4]

Further, the proof data generation unit 11 acquires the authentication data m stored in the authentication data memory unit 111 and performs calculation of the following expression (5-3) to obtain r, using the authentication data m and the value v determined from V:

[Expression 33]

$$r = m + v \bmod n \quad (5\text{-}3)$$

[Step 5]

The exponent generation unit 113 in the proof data generation device 11 acquires the user unique identifying information e stored in the user unique identifying information memory unit 112 and also acquires the verification information Y stored in the authentication data memory unit 111, then performs calculation of the following expression (5-4):

[Expression 34]

$$F(e, Y) \quad (5\text{-}4)$$

[Step 6]

Using the data generated in the exponent generation unit 113 and also using r and u, the proof data generation unit 115 performs calculation of the following expression (5-5) to obtain s:

[Expression 35]

$$s = u - rF(e, Y) \bmod n \quad (5\text{-}5)$$

[Step 7]

The proof data generation device 11 sends s and R back to the proof data verification device 10 and the authentication data memory unit 105.

[Step 8]

The verification computation unit 106 in the proof data verification device 10 acquires verification information Y and point P from the access ticket public key memory unit 101, further acquires the access ticket t stored in the access ticket memory unit 102, and performs calculation of the following expression (5-6):
[Expression 36]

$$K=rY+sP-rtP \qquad (5\text{-}6)$$

[Step 9]

The verification computation unit 106 acquires authentication data m from the authentication data memory unit 104 and verifies whether the value k determined from K, as well as r and m, satisfy the following relationship (5-7):
[Expression 37]

$$r-k \equiv m (\bmod n) \qquad (5\text{-}7)$$

Only when the combination of the access ticket t used in the proof data verification device 10 with the user unique identifying information e is correct, a congruent expression of the expression (5-7) is established and verification is effected correctly.

[Sixth Embodiment]

Now, a description will be given of the sixth embodiment of the present invention. In this embodiment, an access ticket is utilized in connection with Schnorr signature.

Figure 9:
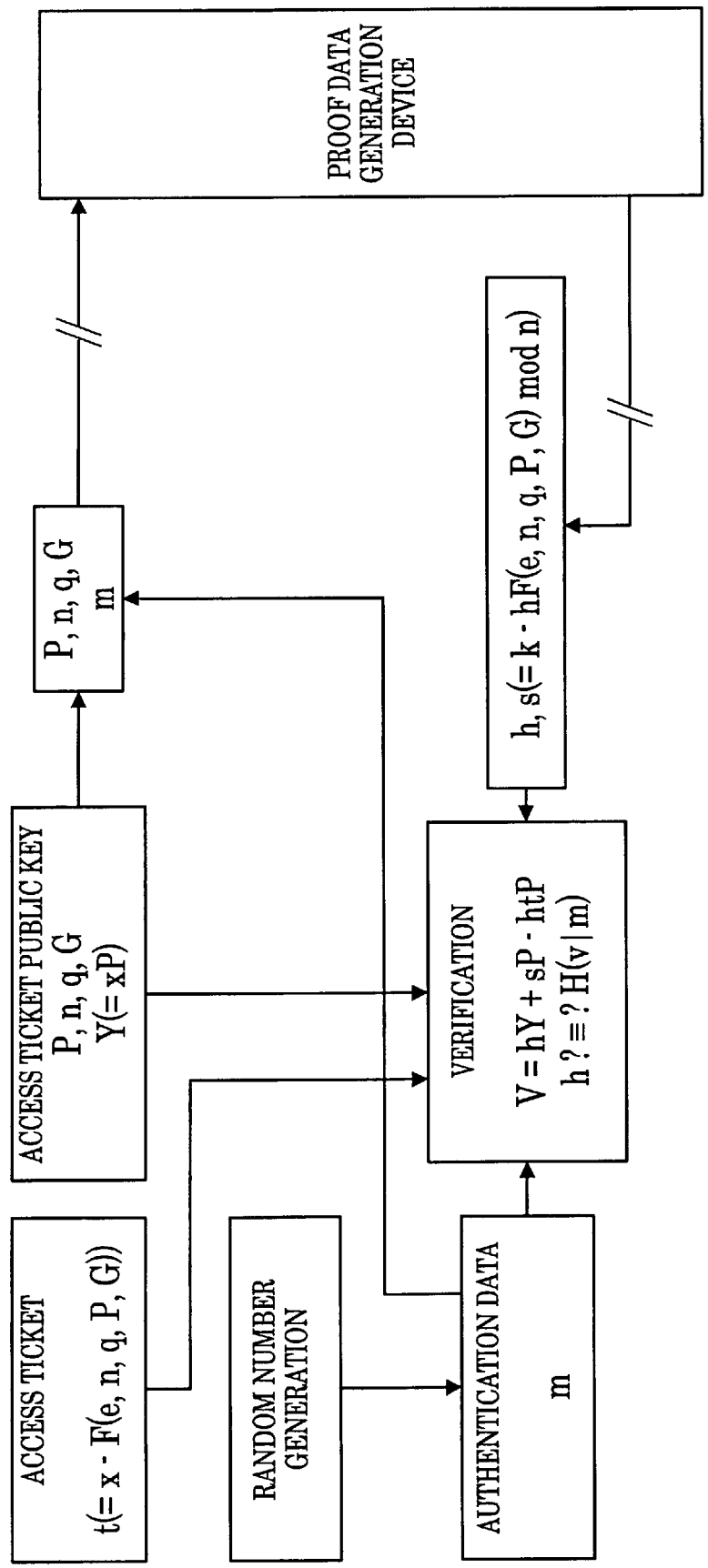
FIG. 9 is a diagram showing the operation of a proof data verification device used in the sixth embodiment of the invention.
Figure 18:
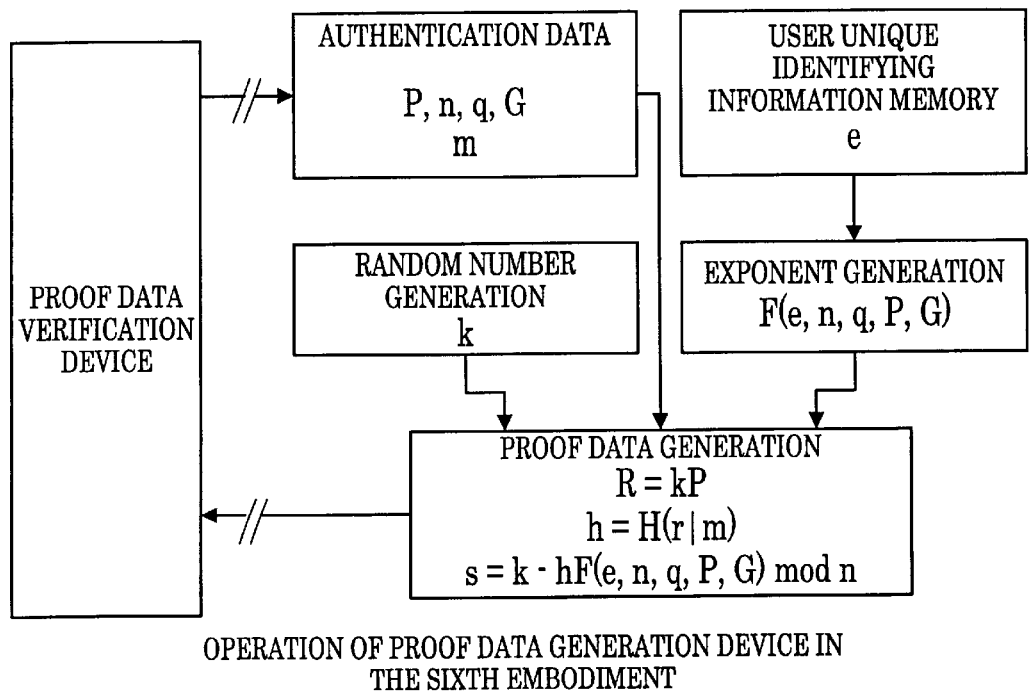
FIG. 18 is a diagram showing the operation of a proof data generation device used in the sixth embodiment.

The proof data verification device 10 and the proof data generation device 11 both used in this embodiment are of the same configurations as in the first embodiment (see FIGS. 2 and 3) and the operations of the devices 10 and 11 are shown in FIGS. 9 and 18, respectively.

In this sixth embodiment, the unique security characteristic information x and verification information Y corresponding to the x are in such a relation as they satisfy the following expression (6-1) with respect to an algebraic group G on a finite field $F_q$ having q number of elements and point P with an order of n on G:
[Expression 38]

$$Y=xP \qquad (6\text{-}1)$$

The above q, G, Y, P and n are stored in the access ticket public key memory unit 101.

Further, for identifying each user, there is determined a user unique identifying information e which is a number different for each user and which is stored in the user unique identifying information memory unit 112.

An access ticket t is generated in accordance with the following expression (6-2):
[Expression 39]

$$t=x-F(e, n, q, P, G) \qquad (6\text{-}2)$$

Alternatively, the value of t may be determined under the modulus n like the following expression (6-3):
[Expression 40]

$$t=x-F(e, n, q, P, G) \bmod n \qquad (6\text{-}3)$$

In this embodiment, the generation and verification of signature are effected in conformity with Schnorr signature.

The operation of this embodiment will be described below.

[Step 1]

The proof data verification device 10 is turned ON upon user access.

[Step 2]

In the proof data verification device 10, a random number is generated by the random number generation unit 103 and is stored as authentication data m in the proof data memory unit 104. Further, the authentication data m, the parameters q and G stored in the access ticket public key memory unit 101 to define the algebraic group G, and the foregoing point P and order n, are stored in the authentication data memory unit 111 included in the proof data generation device 11.

[Step 3]

In the proof data generation device 11, the random number generation unit 114 generates an appropriate random number k, while the proof data generation unit 115 multiplies the point P stored in the authentication data memory unit 111 by k to generate a point R on G. The point R satisfies the following expression (6-4):
[Expression 41]

$$R=kP \qquad (6\text{-}4)$$

[Step 4]

Further, the proof data generation unit 115 acquires the authentication data m stored in the authentication data memory unit 111 and generates a function value h of a non-conflictive function H which depends on the value r|m as a combined value of both the authentication data m and the value r determined from R. The function value h satisfies the following expression (6-5):
[Expression 42]

$$h=H(r|m) \qquad (6\text{-}5)$$

[Step 5]

The exponent generation unit 113 in the proof data generation device 11 acquires the user unique identifying information e stored in the user unique identifying information unit 112 and also acquires q, G, P and n stored in the authentication memory unit 111, then performs calculation of the following expression (6-6):
[Expression 43]

$$F(e, n, q, P, G)+tm \qquad (6\text{-}6)$$

[Step 6]

Using the data generated in the exponent generation unit 113 and also using k and h, the proof data generation unit 11 performs calculation of the following expression (6-7) to obtain s:
[Expression 44]

$$s=k-hF(e, n, q, P, G)+tm \qquad (6\text{-}7)$$

[Step 7]

The proof data generation device 11 sends s and h back to the authentication data memory unit 105 in the proof data verification device 10.

[Step 8]

The verification computation unit 106 in the proof data verification device 10 acquires verification information Y and point P from the access ticket public key memory unit 101, also acquires the access ticket t stored in the access ticket memory unit 102, and performs calculation of the following expression (6-8):
[Expression 45]

$$V=hY+sP-htP \qquad (6\text{-}8)$$

[Step 9]

The verification computation unit 106 acquires authentication data m from the authentication data memory unit 104 and verifies whether the value v determined from V and the authentication data m satisfy the following relationship (6-9):
[Expression 46]

$$h=H(v|m) \qquad (6\text{-}9)$$

Only when the combination of the access ticket t used in the proof data verification device 10 with the user unique identifying information e is correct, a congruent expression of the expression (6-9) is established and verification is effected correctly.

[Seventh Embodiment]

The seventh embodiment of the present invention will now be described, which is a modification of the sixth embodiment. In this embodiment, the method for constructing Schnorr signature, how to generate authentication data m, properties to be satisfied, and how to generate the signature to the authentication data in the proof data generation device, are the same as in the sixth embodiment. However, the parameters to define the algebraic group and the point P on G are common in all of the proof data generation device 11 and the proof data verification device 10 and are stored in an area capable of being accessed from the exponent generation unit 113 and the proof data generation unit 115 in the proof data generation device 11.

Access ticket t used in this embodiment is generated in accordance with the following expression (7-1):

[Expression 47]

$$t=x-F(e, Y) \bmod n \qquad (7-1)$$

Figure 10:
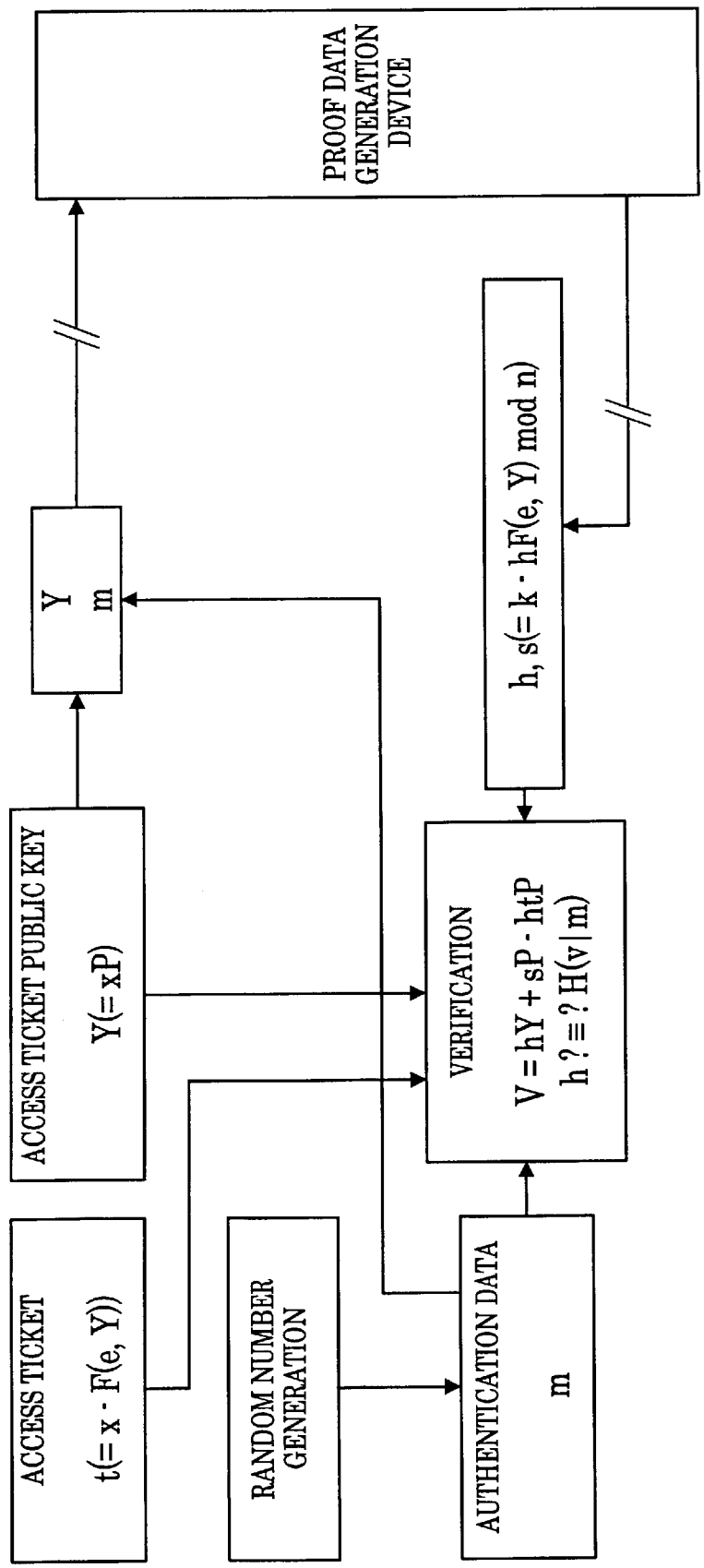
FIG. 10 is a diagram showing the operation of a proof data verification device used in the seventh embodiment of the invention.
Figure 19:
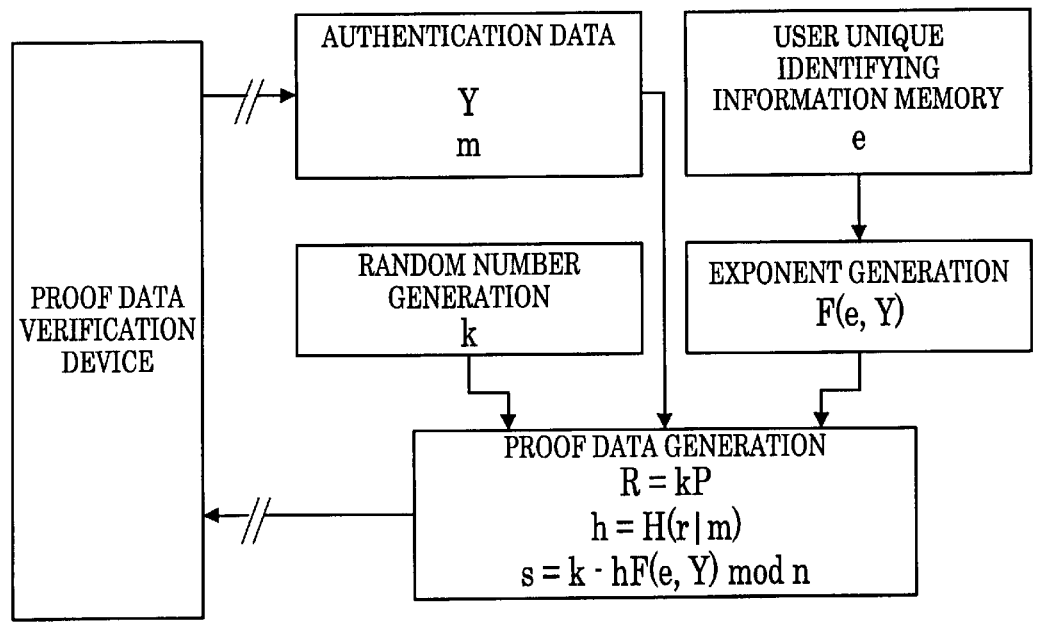
FIG. 19 is a diagram showing the operation of a proof data generation device used in the seventh embodiment.

The proof data verification device 10 and the proof data generation device 11 both used in this embodiment are of the same configurations as in the first embodiment (see FIGS. 2 and 3) and the operations of the devices 10 and 11 are shown in FIGS. 10 and 19, respectively.

The operation of this embodiment will be described below.

[Step 1]

The proof data verification device 10 is turned ON when the user makes an access thereto.

[Step 2]

In the proof data verification device 10, a random number is generated by the random number generation unit 103 and is stored as authentication data m in the authentication data memory unit 104. Further, the authentication data m and verification information Y are stored in the authentication data memory unit 11 included in the proof data generation device 111.

[Step 3]

In the proof data generation device 11, the random number generation unit 14 generates an appropriate random number k, while the proof data generation unit 115 multiplies the point P stored in the authentication data memory unit 111 by k to generate a point R on G. The point R satisfies the following expression (7-2):

[Expression 48]

$$R=kP \qquad (7-2)$$

[Step 4]

Further, the proof data generation unit 11 acquires the authentication data m stored in the authentication data memory unit 111 and generates a function value h of a non-conflictive function H which depends on the value r|m as a combined value of both authentication data m and value r determined from R. The function value h satisfies the following expression (7-3):

[Expression 49]

$$h=H(r|m) \qquad (7-3)$$

[Step 5]

The exponent generation unit 113 in the proof data generation device 111 acquires the user unique identifying information e stored in the user unique identifying information memory unit 112 and also acquires the verification information Y stored in the authentication at a memory unit 111, the performs calculation of the following expression (7-4):

[Expression 50]

$$F(e, Y) \qquad (7-4)$$

[Step 6]

Using the data generated in the exponent generation unit 113 and also using k and h, the proof data generation unit 11 performs calculation of the following expression (7-5) to obtain s:

[Expression 51]

$$s=k-hF(e, Y) \qquad (7-5)$$

[Step 7]

The proof data generation device 11 sends the s and h back to the authentication data memory unit 105 in the proof data verification device 10.

[Step 8]

The verification computation unit 106 in the proof data verification device 10 acquires verification information Y and point P from the access ticket public key memory unit 101 and also acquires the access ticket t stored in the access ticket memory unit 102, then performs calculation of the following expression:

[Expression 52]

$$V=hY+sP-htP \qquad (7-6)$$

[Step 9]

The verification computation unit 106 acquires the authentication data m from the authentication data memory unit 104 and verifies whether the value v determined from V and the authentication data m satisfy the following relationship (7-7):

[Expression 53]

$$h=H(v|m) \qquad (7-7)$$

Only when the combination of the access ticket t used in the proof data verification device 10 with the user unique identifying information e is correct, a congruent expression of the expression (7-7) is established and verification is effected correctly.

[Eighth Embodiment]

The eighth embodiment of the present invention will now be described, in which an access ticket is utilized in connection with DSA signature.

Figure 11:
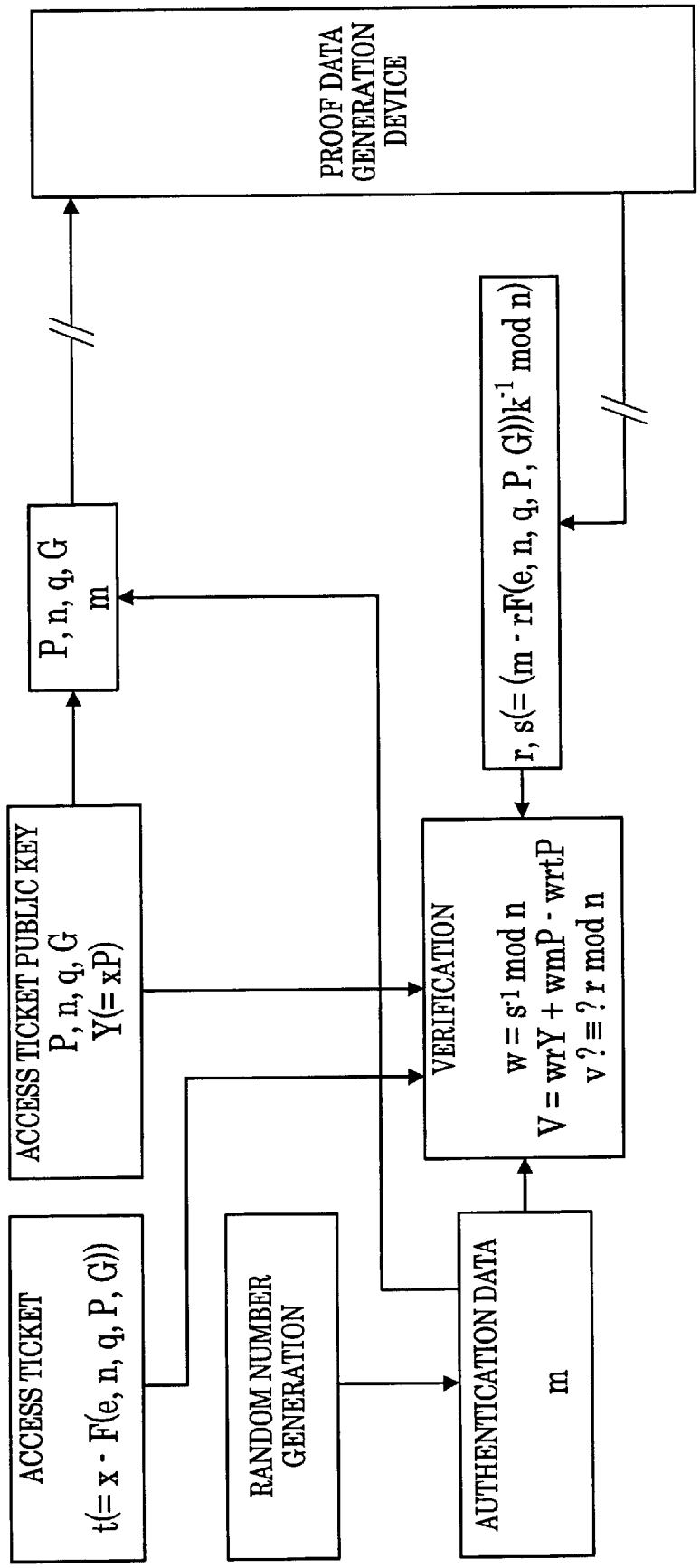
FIG. 11 is a diagram showing the operation of a proof data verification device used in the eighth embodiment of the invention.
Figure 20:
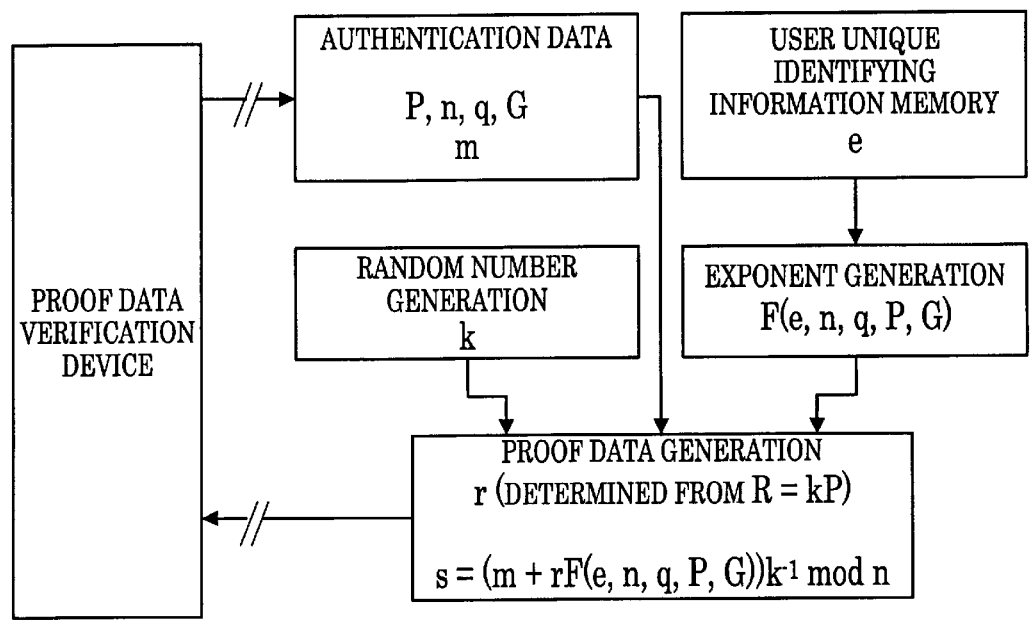
FIG. 20 is a diagram showing the operation of a proof data generation device used in the eighth and ninth embodiments.

The proof data verification device 10 and the proof data generation device 11 both used in this embodiment are of the same configurations as in the first embodiment (see FIGS. 2 and 3) and the operations of the devices 10 and 11 are shown in FIGS. 11 and 20, respectively.

In this eighth embodiment, the unique security characteristic information x and verification information Y corresponding to the x are in such a relation as they satisfy the following expression (8-1) with respect to an algebraic group G on a finite field $F_q$ with q elements and point P with an order of n on G:

[Expression 54]

$$Y=xP \qquad (8-1)$$

The above q, G, Y, P and n are stored in the access ticket public key memory unit 101.

For identifying each user, user unique identifying information e is determined. The user unique identifying information e is a different number for each user and is stored in the user unique identifying information memory unit 112.

Access ticket t is generated in accordance with the following expression (8-2). It is assumed here that the trueness of t has been proved by a predetermined method.
[Expression 55]

$$t = x - F(e, n, q, P, G) \tag{8-2}$$

Alternatively, the value of t may be determined under the modulus n like the following expression (8-3):
[Expression 56]

$$t = x - F(e, n, q, P, G) \bmod n \tag{8-3}$$

In this embodiment, the generation and verification of signature are effected in conformity with DSA signature.

The operation of this embodiment will be described below.

[Step 1]

The proof data verification device 10 is turned ON when the user makes an access thereto.

[Step 2]

In the proof data verification device 10, a random number is generated by the random number generation unit 103 and is stored as authentication data m in the authentication data memory unit 104. Further, the authentication data m, the parameters q and G stored in the access ticket public key memory unit 101 to define the algebraic group G, as well as the foregoing point P and order n, are stored in the authentication data memory unit 111 included in the proof data generation device 11.

[Step 3]

In the proof data generation device 11, the random number generation unit 114 generates an appropriate random number k, while the proof data generation unit 115 generates the value r determined from point R on G which point R is obtained by multiplying the point P stored in the authentication data memory unit 111 by k. The point R satisfies the following expression (8-4):
[Expression 57]

$$R = kP \tag{8-4}$$

[Step 4]

The exponent generation unit 113 in the proof data generation device 11 acquires the user unique identifying information e stored in the user unique identifying information memory unit 112 and also acquires q, G, P and n stored in the authentication data memory unit 111, then performs calculation of the following expression (8-5):
[Expression 58]

$$F(e, n, q, P, G) \tag{8-5}$$

[Step 5]

The proof data generation unit 11 acquires the authentication data m stored in the authentication data memory unit 111 and performs calculation of the following expression (8-6) to obtain s, using the authentication data m and the data generated in the exponent generation unit 113:
[Expression 59]

$$s = [m + rF(e, n, q, P, G)]k^{-1} \bmod n \tag{8-6}$$

[Step 6]

The proof data generation device 11 sends the s and r back to the authentication data memory unit 105 in the proof data verification device 10.

[Step 7]

The verification computation unit 106 in the proof data verification device 10 performs calculation of the following expression (8-7):
[Expression 60]

$$w = s^{-1} \bmod n \tag{8-7}$$

[Step 8]

The verification computation unit 106 acquires both verification information Y and point P from the access ticket public key memory unit 101, further acquires the access ticket t stored in the access ticket memory unit 102, and performs calculation of the following expression (8-8):
[Expression 61]

$$V = wrY + wmP - wrtP \tag{8-8}$$

[Step 9]

The verification computation unit 106 acquires authentication data m from the authentication data memory unit 104 and verifies whether the value v determined from V and r satisfy the following relationship (8-9):
[Expression 62]

$$v \equiv r(\bmod n) + tm \tag{8-9}$$

Only when the combination of the access ticket t used in the proof data verification device 10 with the user unique identifying information e is correct, a congruent expression of the expression (8-9) is established and verification is effected correctly.

[Ninth Embodiment]

Description is now directed to the ninth embodiment of the present invention, which is a modification of the eighth embodiment. In this embodiment, the method for constructing DSA signature, how to generate authentication data m, properties to be satisfied, and how to generate the signature in the proof data generation device, are the same as in the eighth embodiment. However, an access ticket t used in this embodiment is generated in accordance with the following expression (9-1):
[Expression 63]

$$t = x^{-1} F(e, n, q, P, G) \bmod n \tag{9-1}$$

Figure 12:
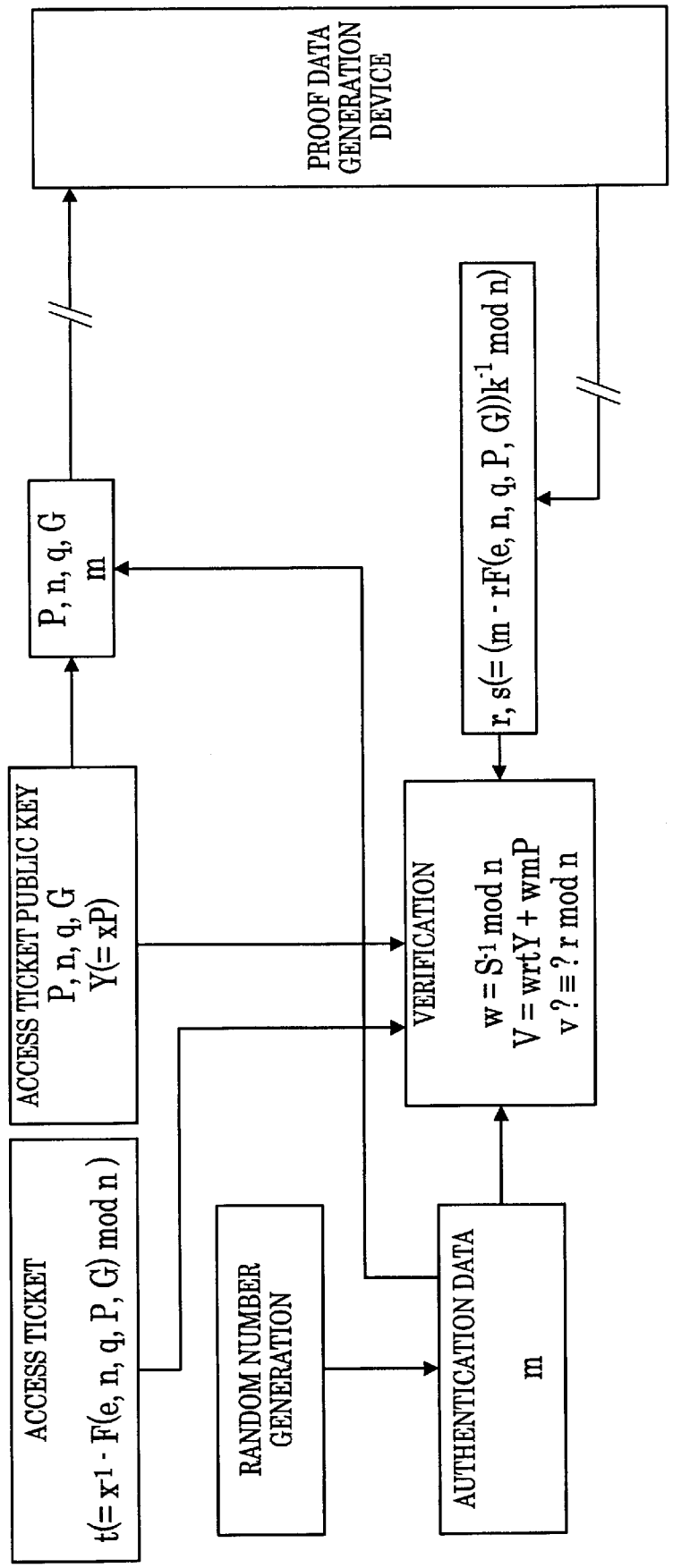
FIG. 12 is a diagram showing the operation of a proof data verification device used in the ninth embodiment of the invention.

The proof data verification device 10 and proof data generation device 11 used in this embodiment are of the same configurations as in the first embodiment (see FIGS. 2 and 3) and the operations of the devices 10 and 11 are shown in FIGS. 12 and 20, respectively.

The operation of this embodiment will be described below.

[Step 1]

The operation of the proof data verification device 10 is started upon user access.

[Step 2]

In the proof data verification device 10, a random number is generated by the random number generation unit 103 and is stored as authentication data m in the authentication data memory unit 104. Further, the authentication data m, the parameters q and G stored in the access ticket public key memory unit 101 to define the algebraic group G, and the foregoing point P and order n, are stored in the authentication data memory unit 111 included in the proof data generation device 11.

[Step 3]

The random number generation unit 14 in the proof data generation device 11 generates an appropriate random number k, while the proof data generation unit 115 generates the value r determined from point R on G which point R is obtained by multiplying the point P stored in the authentication data memory unit 111 by k. The point R satisfies the following expression (9-2):
[Expression 64]

$$R=kP \tag{9-2}$$

[Step 4]
The exponent generation unit 113 in the proof data generation device 11 acquires the user unique identifying information e stored in the user unique identifying information memory unit 112 and also acquires n, q, P and G which are stored in the authentication data memory unit, then performs calculation of the following expression (9-3):
[Expression 65]

$$F(e, n, q, P, G) \tag{9-3}$$

[Step 5]
The proof data generation unit 11 acquires the authentication data m stored in the authentication data memory unit 111 and performs calculation of the following expression (9-4) to obtain s, using the authentication data m and the data generated in the exponent generation unit 113:
[Expression 66]

$$s=[m+rF(e, n, q, P, G)]k^{-1} \bmod n \tag{9-4}$$

[Step 6]
The proof data generation device 11 sends the s and r back to the authentication data memory unit 105 in the proof data verification device 10.
[Step 7]
The verification computation unit 106 in the proof data verification device 10 performs calculation of the following expression (9-5):
[Expression 67]

$$w=s^{-1} \bmod n \tag{9-5}$$

[Step 8]
The verification computation unit 106 acquires verification information Y and point P from the access ticket public key memory unit 101 and also acquires the access ticket t stored in the access ticket memory unit 102, then performs calculation of the following expression (9-6):
[Expression 68]

$$V=wrtY+wmP \tag{9-6}$$

[Step 9]
The verification computation unit 106 acquires the authentication data m from the authentication data memory unit 104 and verifies whether the value v determined from V and r satisfy the following relationship (9-7):
[Expression 69]

$$v \equiv r (\bmod n) \tag{9-7}$$

Only when the combination of the access ticket t used in the proof data verification device 10 with the user unique identifying information e is correct, a congruent expression of the expression (9-7) is established and verification is effected correctly.
[Tenth Embodiment]
Reference will now be made to the tenth embodiment of the present invention, which is a modification of the eighth embodiment. In this embodiment, the method for constructing DSA signature, how to generate authentication data m, properties to be satisfied, and how to generate the signature to the authentication data in the proof data generation device, are the same as in the eighth embodiment. However, the parameters for defining the algebraic group G and the point P on G are common in all of the proof data generation device 11 and the proof data verification device 10 and are stored in an area capable of being accessed from the exponent generation unit 113 and proof data generation unit 115 in the proof data generation device 11.

The access ticket t used in this embodiment is generated in accordance with the following expression (10-1):
[Expression 70]

$$t=x-F(e, Y) \tag{10-1}$$

Figure 13:
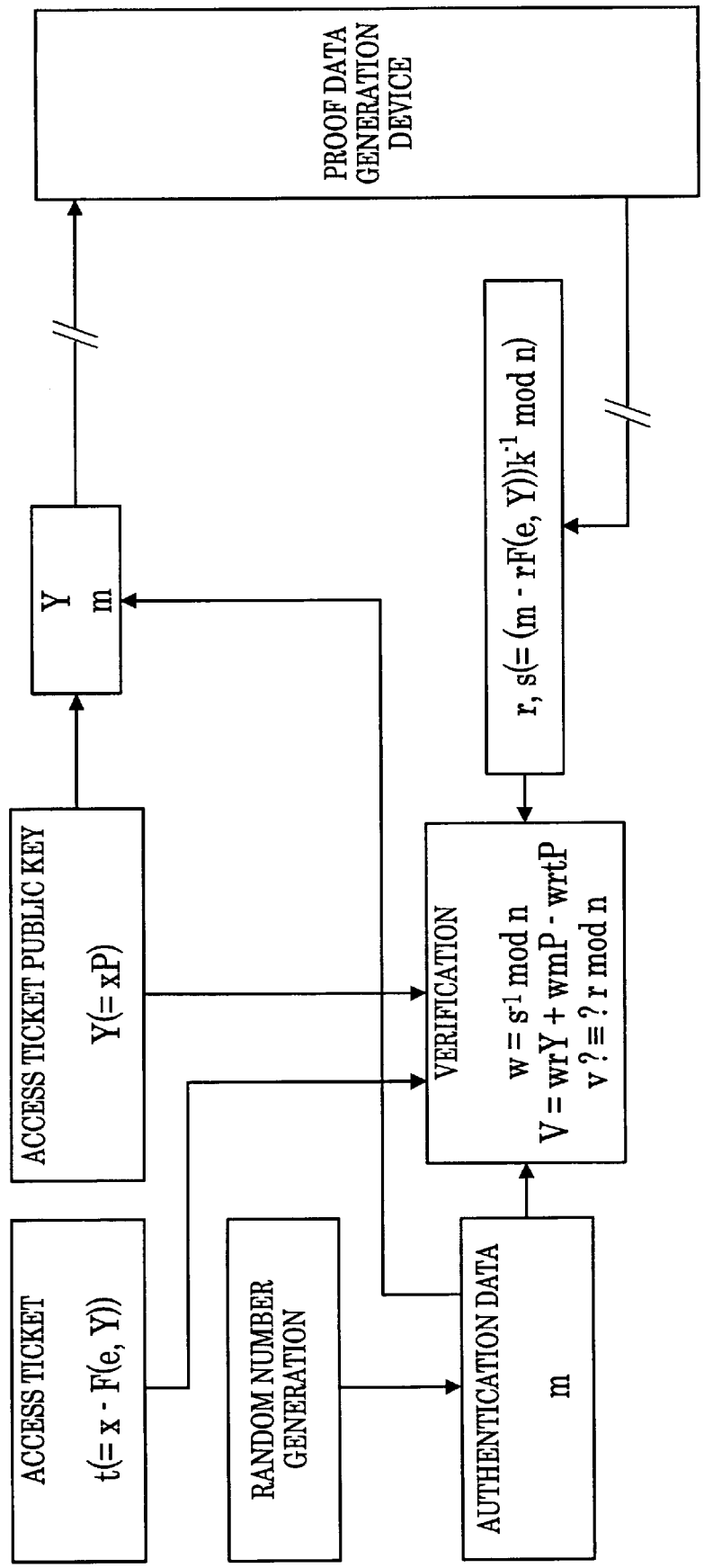
FIG. 13 is a diagram showing the operation of a proof data verification device used in the tenth embodiment of the invention.
Figure 21:
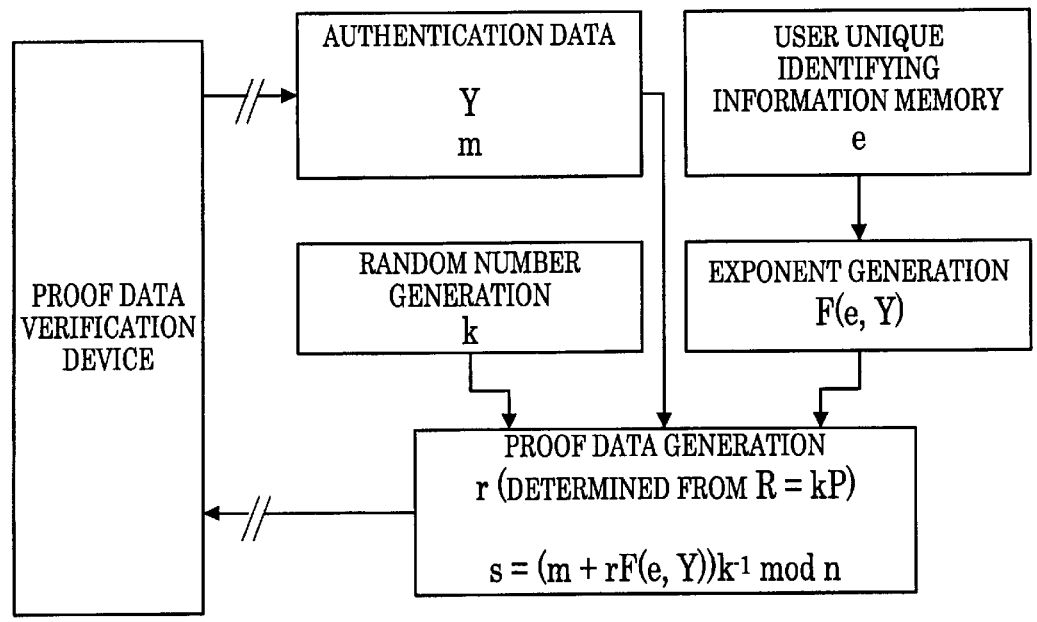
FIG. 21 is a diagram showing the operation of a proof data generation device used in the tenth embodiment.

In this embodiment, the operation of the proof data verification device and that of the proof data generation device are shown in FIGS. 13 and 21, respectively.
The operation of this embodiment will be described below.
[Step 1]
The operation of the proof data verification device 10 is started upon user access.
[Step 2]
In the proof data verification device 10, a random number is generated by the random number generation unit 103 and is stored as authentication data m in the authentication data memory unit 104. Further, the authentication data m and verification information Y are stored in the authentication data memory unit 111 included in the proof data generation device 11.
[Step 3]
In the proof data generation device 11, the random number generation unit 114 generates an appropriate random number k, while the proof data generation unit 115 generates the value r determined from point R on G which point R is obtained by multiplying the point stored in the authentication data memory unit 111 by k. The point R satisfies the following expression (10-2):
[Expression 71]

$$R=kP \tag{10-2}$$

[Step 4]
The exponent generation unit 113 in the proof data generation device 11 acquires the user unique identifying information e stored in the user unique identifying information memory unit 112 and performs calculation of the following expression (10-3):
[Expression 72]

$$F(e, Y) \tag{10-3}$$

[Step 6]
The proof data generation unit 11 acquires the authentication data m stored in the authentication data memory unit 111 and performs calculation of the following expression (10-4) to obtain s, using the authentication data m, the value r determined from R which was generated by the expression (10-2) in the above step 3 and further using the data generated in the exponent generation unit 113:
[Expression 73]

$$s=[m+rF(e, Y)]k^{-1} \bmod n \tag{10-4}$$

[Step 5]
The proof data generation device 11 sends the s and r back to the authentication data memory unit 105 in the proof data verification device 10.

[Step 6]

The verification computation unit 106 in the proof data verification device 10 performs calculation of the following expression (10-5):

[Expression 74]

$$w = s^{-1} \bmod n \qquad (10\text{-}5)$$

[Step 7]

The verification computation unit 106 acquires verification information Y and point P from the access ticket public key memory unit 101, also acquires the access ticket t stored in the access ticket memory unit 102, and performs calculation of the following expression (10-6):

[Expression 75]

$$V = wrY + wmP - wrtP \qquad (10\text{-}6)$$

[Step 8]

The verification computation unit 106 acquires authentication data m from the authentication data memory unit 104 and verifies whether the value v determined from V and r satisfy the following relationship (10-7):

[Expression 76]

$$v \equiv r (\bmod n) \qquad (10\text{-}7)$$

Only when the combination of the access ticket t used in the proof data verification device 10 with the user unique identifying information e is correct, a congruent expression of the expression (10-7) is established and verification is effected correctly.

Also in this embodiment there may be adopted the same ticket form as in the ninth embodiment, as shown in the following expression (10-8):

[Expression 77]

$$t = x^{-1} F(e, Y) \bmod n \qquad (10\text{-}8)$$

In this case, the proof data generation device 11 performs the same calculations as the expressions (10-2) and (10-4), while the proof data verification device 10 performs the calculation of the expression (10-6) and verifies whether the relationship of the expression (10-7) is satisfied or not.

According to the present invention, as will be seen from the above description, by introducing proof support data (access ticket), it is possible to make unique security characteristic information and user unique identifying information independent of each other, so that it suffices for the protector side and the user side to each provide only one piece of unique identifying information.

The access ticket is data which is calculated on the basis of both specific user unique identifying information and unique security characteristic information, and without the knowledge of user unique identifying information it is difficult to calculate unique security characteristic information from the access ticket. Only when a correct combination of user unique identifying information with an access ticket, namely a combination of user unique identifying information with an access ticket calculated on the basis of the user unique identifying information, is inputted, there is calculated correct proof data. Therefore, the user holds his or her unique identifying information in advance, while the protector side such as a programmer prepares unique security characteristic information independently of the user unique identifying information, then an access ticket is prepared and distributed in accordance with the user unique identifying information and the unique security characteristic information which has been used, for example, in preparing an application program, whereby it is possible to effect the authentication of user unique security such as execution control or the like.

According to the present invention, moreover, it becomes possible to make a safe distribution of signature key, and a simple key deposit mechanism can be implemented.

What is claimed is:

1. A device for authenticating user's access rights to resources by verifying the legitimacy of proof data generated to prove the right of said user, said device comprising:

first memory means for storing authentication data;

second memory means for storing unique identifying information of the user;

third memory means for storing proof support information t which is the result of having conducted a predetermined calculation for both said user unique identifying information and unique security characteristic information, wherein said unique security characteristic information is an integer x, and in a linear algebraic group G on a finite field where if a point with an order of n is P, verification information Y corresponding to the x is a point Y=xP on G obtained by multiplying the P by x;

proof data generation means which perform a predetermined calculation for both said authentication data held in said first memory means and said user unique identifying information held in said second memory means, to generate proof data R on G and an integer s; and proof data verification means which perform a predetermined calculation for both said proof data R on G and the integer s generated by said proof data generation means and said proof support information t held by said third memory means, to verify that said proof data has been generated on the basis of said user unique identifying information.

2. The device for authenticating user's access rights to resources according to claim 1, wherein said proof support information stored in said third memory means has been proved to have trueness.

3. The device for authenticating user's access rights to resources according to claim 1, wherein said proof support information stored in said third memory means is created from said unique security characteristic information, said user unique identifying information and a verification information corresponding to said unique security characteristic information.

4. The device for authenticating user's access rights to resources according to claim 1, wherein said proof support information stored in said third memory means is created from said unique security characteristic information, said user unique identifying information, and information which defines the algebraic group on the finite field for the digital signature.

5. The device for authenticating user's access rights to resources according to claim 1, wherein said proof support information stored in said third memory means is created from said unique security characteristic information, said user unique identifying information, an element of an algebraic group on a finite field for the digital signature with verification information being determined from said characteristic information and said element, and the verification information which corresponds to said characteristic information.

6. The device for authenticating user's access rights to resources according to claim 1, wherein said proof support information stored in said third memory means is created from said unique security characteristic information, said user unique identifying information, information which defines the algebraic group on the finite field for the digital signature, and verification information corresponding to said unique security characteristic information.

7. The device for authenticating user's access rights to resources according to claim 1, wherein said proof support information stored in said third memory means is created from said unique security characteristic information, said user unique identifying information, information which defines the algebraic group on the finite field for the digital signature, and an element of said algebraic group with verification information being determined from both said characteristic information and said element.

8. The device for authenticating user's access rights to resources according to claim 1, wherein said proof support information stored in said third memory means is created from said unique security characteristic information, said user unique identifying information, information which defines the algebraic group on the finite field for the digital signature, an element of said algebraic group with verification information being determined from both said characteristic information and said element, and the verification information which corresponds to said characteristic information.

9. The device for authenticating user's access rights to resources according to claim 1, wherein said proof support information stored in said third memory means is created from a value calculated with said user unique identifying information as an input of a collision-free function, and said unique security characteristic information.

10. The device for authenticating user's access rights to resources according to claim 1, wherein said proof support information stored in said third memory means is created from a value calculated with both said user unique identifying information and verification information corresponding to said unique security characteristic information as an input of a collision-free function, and said unique security characteristic information.

11. The device for authenticating user's access rights to resources according to claim 1, wherein said proof support information stored in said third memory means is created from a value calculated with both said user unique identifying information and an element of the algebraic group on the finite field for the digital signature as an input of a collision-free function with verification information being determined from both said characteristic information and said element, and said unique security characteristic information.

12. The device for authenticating user's access rights to resources according to claim 1, wherein said proof support information stored in said third memory means is created from a value calculated with both said user unique identifying information and information which defines the algebraic group on the finite field for the digital signature as an input of a collision-free function, and said unique security characteristic information.

13. The device for authenticating user's access rights to resources according to claim 1, wherein said proof support information stored in said third memory means is created from a value calculated with said user unique identifying information, an element of the algebraic group for the digital signature with verification information being determined from both said characteristic information and said element, and the verification information which corresponds to said characteristic information, as an input of a collision-free function, and said unique security characteristic information.

14. The device for authenticating user's access rights to resources according to claim 1, wherein said proof support information stored in said third memory means is created from a value calculated with said user unique identifying information, information which defines the algebraic group for the digital signature, and verification information corresponding to said unique security characteristic information, as an input of a collision-free function, and said unique security characteristic information.

15. The device for authenticating user's access rights to resources according to claim 1, wherein said proof support information stored in said third memory means is created from a value calculated with said user unique identifying information, information which defines the algebraic group for the digital signature, and an element of the algebraic group with verification information being determined from both said characteristic information and said element, as an input of a collision-free function, and said unique security characteristic information.

16. The device for authenticating user's access rights to resources according to claim 1, wherein said proof support information stored in said third memory means is created from a value calculated with said user unique identifying information, information which defines the algebraic group for the digital signature, an element of the algebraic group with verification information being determined from both said characteristic information and said element, and the verification information which corresponds to said characteristic information, as an input of a collision-free function, and said unique security characteristic information.

17. The device for authenticating user's access rights to resources according to claim 1, wherein at least said second memory means and said proof data generation means are held in protective means which make it difficult to observe interior data and processing procedure difficult to observe from the exterior.

18. The device for authenticating user's access rights to resources according to claim 1, wherein at least said second memory means and said proof data generation means are constituted as a small-sized, portable computing unit such as, for example, an IC card.

19. The device for authenticating user's access rights to resources according to claim 1, further comprising a proof data generation device and a proof data verification device, said proof data generation device including at least said first memory means, said second memory means, said third memory means and said proof data generation means, and said proof data verification device including at least said proof data verification means, fourth memory means for storing authentication data, and fifth memory means for storing proof data, said proof data generation device and said proof data verification device communicating with each other to authenticate a unique security of the user, wherein:

said proof data verification device writes the authentication data stored in said fourth memory means into said first memory means in said proof data generation device;

said proof data generation device writes proof data into said fifth memory means in said proof data verification device, said proof data having been generated by said proof data generation means on the basis of said authentication data stored in said first memory means; and said proof data verification device authenticates a unique security of the user by use of said proof data stored in said fifth memory means.

20. A method for authenticating user's access rights to resources by verifying the legitimacy of proof data generated to prove the right of said user, which method comprises:

a first memory step of storing authentication data;

a second memory step of storing a user unique identifying information;

a third memory step of storing proof support information t which is the result of having performed a predetermined calculation for both said user unique identifying information and a unique security characteristic information, said unique security characteristic information is an integer x, and in a linear algebraic group G on a finite field where if a point with an order of n is P, verification information Y corresponding to the x is a point Y=xP on G obtained by multiplying the P by x;

a proof data generation step of generating proof data R on G and an integer s by performing a predetermined calculation for both said authentication data held in said first memory step and said user unique identifying information held in said second memory step; and a proof data verification step of verifying that said proof data has been generated on the basis of said user unique identifying information, by performing a predetermined calculation for both said proof data both R on G and the positive integer s generated in said proof data generation step and said proof support information t held in said third memory step.

21. The device for authenticating user's access rights to resources according to claim 1, wherein said proof support information t stored in said third memory means is created from said unique security characteristic information, said user unique identifying information, and a generator of a cyclic subgroup constituted by the whole of verification information in the digital signature, the verification information being determined from both said characteristic information and said generator.

* * * * *